(12) United States Patent
Sun et al.

(10) Patent No.: US 10,891,545 B2
(45) Date of Patent: Jan. 12, 2021

(54) MULTI-DIMENSIONAL TIME SERIES EVENT PREDICTION VIA CONVOLUTIONAL NEURAL NETWORK(S)

(71) Applicant: International Business Machines Corporation, Armonk, NY (US)

(72) Inventors: Wei Sun, Tarrytown, NY (US); Roman Vaculin, Bronxville, NY (US); Jinfeng Yi, Ossining, NY (US); Nianjun Zhou, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 816 days.

(21) Appl. No.: 15/455,241

(22) Filed: Mar. 10, 2017

(65) Prior Publication Data

US 2018/0260697 A1    Sep. 13, 2018

(51) Int. Cl.
*G06N 3/08* (2006.01)
*G06N 3/04* (2006.01)
*G06N 5/02* (2006.01)

(52) U.S. Cl.
CPC ............. *G06N 3/08* (2013.01); *G06N 3/0454* (2013.01); *G06N 5/022* (2013.01)

(58) Field of Classification Search
CPC ......... G06N 3/08; G06N 3/0454; G06N 5/022
See application file for complete search history.

(56) References Cited

U.S. PATENT DOCUMENTS

| | | | |
|---|---|---|---|
| 6,128,606 A | 10/2000 | Bengio et al. | |
| 7,103,460 B1 * | 9/2006 | Breed | B60C 23/0408 |
| | | | 701/29.1 |
| 8,635,328 B2 | 1/2014 | Corley et al. | |
| 9,224,090 B2 | 12/2015 | Piekniewski et al. | |
| 9,373,059 B1 | 6/2016 | Heifets et al. | |

(Continued)

FOREIGN PATENT DOCUMENTS

WO    2009149126 A2    12/2009

OTHER PUBLICATIONS

Chen et al., "CNNTracker: Online discriminative object tracking via deep convolutional neural network", Applied Soft Computing 38 ( 2016) 1088-1098 (Year: 2016).*

(Continued)

*Primary Examiner* — Robert A Cassity
*Assistant Examiner* — Tsu-Chang Lee
(74) *Attorney, Agent, or Firm* — Amin, Turocy & Watson, LLP

(57) ABSTRACT

Techniques that facilitate machine learning using multi-dimensional time series data are provided. In one example, a system includes a snapshot component and a machine learning component. The snapshot component generates a first sequence of multi-dimensional time series data and a second sequence of multi-dimensional time series data from multi-dimensional time series data associated with at least two different data types generated by a data system over a consecutive period of time. The machine learning component that analyzes the first sequence of multi-dimensional time series data and the second sequence of multi-dimensional time series data using a convolutional neural network system to predict an event associated with the multi-dimensional time series data.

20 Claims, 15 Drawing Sheets

(56) References Cited

U.S. PATENT DOCUMENTS

| | | | |
|---|---|---|---|
| 9,990,687 B1* | 6/2018 | Kaufhold | G06N 3/0454 |
| 2004/0167840 A1* | 8/2004 | Tully | G06Q 40/00 |
| | | | 705/35 |
| 2005/0283337 A1 | 12/2005 | Sayal | |
| 2006/0036542 A1 | 2/2006 | McNair | |
| 2011/0028950 A1 | 2/2011 | Raksi et al. | |
| 2011/0218950 A1 | 9/2011 | Mirowski et al. | |
| 2014/0121119 A1 | 5/2014 | Stormo et al. | |
| 2014/0241621 A1 | 8/2014 | Medvedovsky et al. | |
| 2014/0244837 A1 | 8/2014 | Medvedovsky et al. | |
| 2014/0372175 A1 | 12/2014 | Jain et al. | |
| 2015/0161522 A1 | 6/2015 | Saon et al. | |
| 2015/0193472 A1 | 7/2015 | Medvedovsky et al. | |
| 2016/0135704 A1 | 5/2016 | Zhang | |
| 2016/0379109 A1* | 12/2016 | Chung | G06N 3/04 |
| | | | 706/26 |
| 2017/0249534 A1* | 8/2017 | Townsend | G06K 9/6261 |
| 2018/0165894 A1* | 6/2018 | Martin | G07C 5/0808 |

OTHER PUBLICATIONS

Barabanov et al., "Discrete Processes Dynamics Neural Network Simulation Based on Multivariate Time Series Analysis with Significant Factors Delayed Influence Consideration", World Applied Sciences Jounal 23(9): 1239-1244, 2013 (Year: 2013).*

Mantula et al., "Method of Adaptive Forecasting Based ON Multidimensional Linear Extrapolation", International Journal of Research in Engineering and Science (IJRES), vol. 1, Issues 4, Aug. 2013, pp. 31-37 (Year: 2013).*

Srivastava et al., "Dropout: Simple Way to Prevent Neural Networks from Overfitting", Journal of Machine Learning Research 15 ( 2014) 1929-2958 (Year: 2014).*

List of IBM Patents or Applications Treated as Related.

Srinivas, et al., "A Taxonomy of Deep Convolutional Neural Nets for Computer Vision," arXiv:1601.06615v1 [cs.CV] Jan. 25, 2016, 18 pages.

Wang, et al., "Encoding Time Series as Images for Visual Inspection and Classification Using Tiled Convolutional Neural Networks," AAAI 2015 Workshop on Trajectory-Based Behavior Analytics, 7 pages.

Zheng, et al., "Time series classification using multi-channels deep convolutional neural networks," Time Series Classification Using MC-DCNN, Last Accessed: Oct. 27, 2016, 13 pages.

Schmidhuber, et al., "Deep Learning in Neural Networks: An Overview," Technical Report IDSIA-03-14 / arXiv:1404.7828 v3 [cs.NE], Jul. 2, 2014, 75 pages.

Begum et al., "Method and System for Providing a Discriminative Model for Discovering Useful Multi Dimensional Time Series Subsequences Shapelets," An IP.com Prior Art Database Technical Disclosure, IP.com Electronic Publication Date: Nov. 26, 2015, 7 pages.

Cetintas, et al., "Method and System for Modelling Content Complexity, Consistency and Effect on User Engagement," An IP.com Prior Art Database Technical Disclosure, IP.com Electronic Publication Date: Jul. 4, 2016, 6 pages.

Office Action for U.S. Appl. No. 15/840,997 dated Nov. 15, 2019, 61 pages.

Makantasis, et al., IEEE International Geoscience and Remote Sensing Symposium (IGARSS), Jul. 26-31, 2015 (Year: 2015).

International Search Report and Written Opinion received for PCT Application Serial No. PCT/EP2017/083850 dated May 4, 2018, 10 pages.

Yang et al., "Deep Convolutional Neural Networks on Multichannel Time Series for Human Activity Recognition", Jul. 31, 2015, XP055421196, pp. 3995-4001.

Mahalakshmi et al., "A survey on forecasting of time series data", 2016 International Conference on computing technologies and intelligent data engineering, IEEE, Jan. 7, 2016, 8 pages.

Domhan et al., "Speeding up Automatic Hyperparameter Optimization of Deep Neural Networks by Extrapolation of Learning Curves", Proceeding of the 24th International Joint Conference on Artificial Intelligence, Jul. 25, 2015, XP055265011, 9 pages.

Final Office Action received for U.S. Appl. No. 15/840,997 dated May 22, 2020, 58 pages.

* cited by examiner

MULTI-DIMENSIONAL TIME SERIES EVENT PREDICTION VIA CONVOLUTIONAL NEURAL NETWORK(S)

BACKGROUND

The subject disclosure relates to machine learning systems, and more specifically, to performing machine learning associated with multi-dimensional time series data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate machine learning using time series data are described.

According to an embodiment, a system can comprise a snapshot component and a machine learning component. The snapshot component can generate a first sequence of multi-dimensional time series data and a second sequence of multi-dimensional time series data from multi-dimensional time series data associated with at least two different data types generated by a data system over a consecutive period of time. The machine learning component can analyze the first sequence of multi-dimensional time series data and the second sequence of multi-dimensional time series data using a convolutional neural network system to predict an event associated with the multi-dimensional time series data.

According to another embodiment, a computer-implemented method is provided. The computer-implemented method can comprise generating, by a system operatively coupled to a processor, a data matrix based on multi-dimensional time series data associated with at least two different data types generated by a data system over a consecutive period of time. The computer-implemented method can also comprise analyzing, by the system, the data matrix associated with the multi-dimensional time series data using a convolutional neural network system. Furthermore, the computer-implemented method can also comprise generating, by the system, prediction data that comprises a predicted event associated with the multi-dimensional time series data based on the analyzing the data matrix using the convolutional neural network system.

According to yet another embodiment, a computer-implemented method is provided. The computer-implemented method can comprise generating, by a system operatively coupled to a processor, a data matrix based on multi-dimensional time series data associated with at least two different data types generated by a data system. The computer-implemented method can also comprise modifying, by the system, the data matrix to generate a modified data matrix based on tuning data associated with a characteristic of the data matrix. Furthermore, the computer-implemented method can comprise performing, by the system, a convolutional neural network process based on the modified data matrix. The computer-implemented method can also comprise predicting, by the system, an event associated with the multi-dimensional time series data based on the convolutional neural network process associated with the modified data matrix.

According to yet another embodiment, a computer program product for machine learning can comprise a computer readable storage medium having program instructions embodied therewith. The program instructions can be executable by a processor and cause the processor to generate, by the processor, a data matrix based on first time series data associated with a first data source and second time series data associated with a second data source. The program instructions can also cause the processor to analyze, by the processor, the data matrix associated with the first time series data and the second time series data using a convolutional neural network system. Furthermore, program instructions can also cause the processor to generate, by the processor, prediction data that comprises a predicted event associated with the first time series data and the second time series data based on data generated by the convolutional neural network system.

According to yet another embodiment, a computer program product for machine learning can comprise a computer readable storage medium having program instructions embodied therewith. The program instructions can be executable by a processor and cause the processor to generate, by the processor, a data matrix based on multi-dimensional time series data associated with at least two different data types. The program instructions can also cause the processor to perform, by the processor, a convolutional neural network process based on the data matrix associated with the multi-dimensional time series data. Furthermore, the program instructions can cause the processor to generate, by the processor, prediction data that comprises a predicted event associated with the multi-dimensional time series data based on the convolutional neural network process.

DETAILED DESCRIPTION

Figure 1:
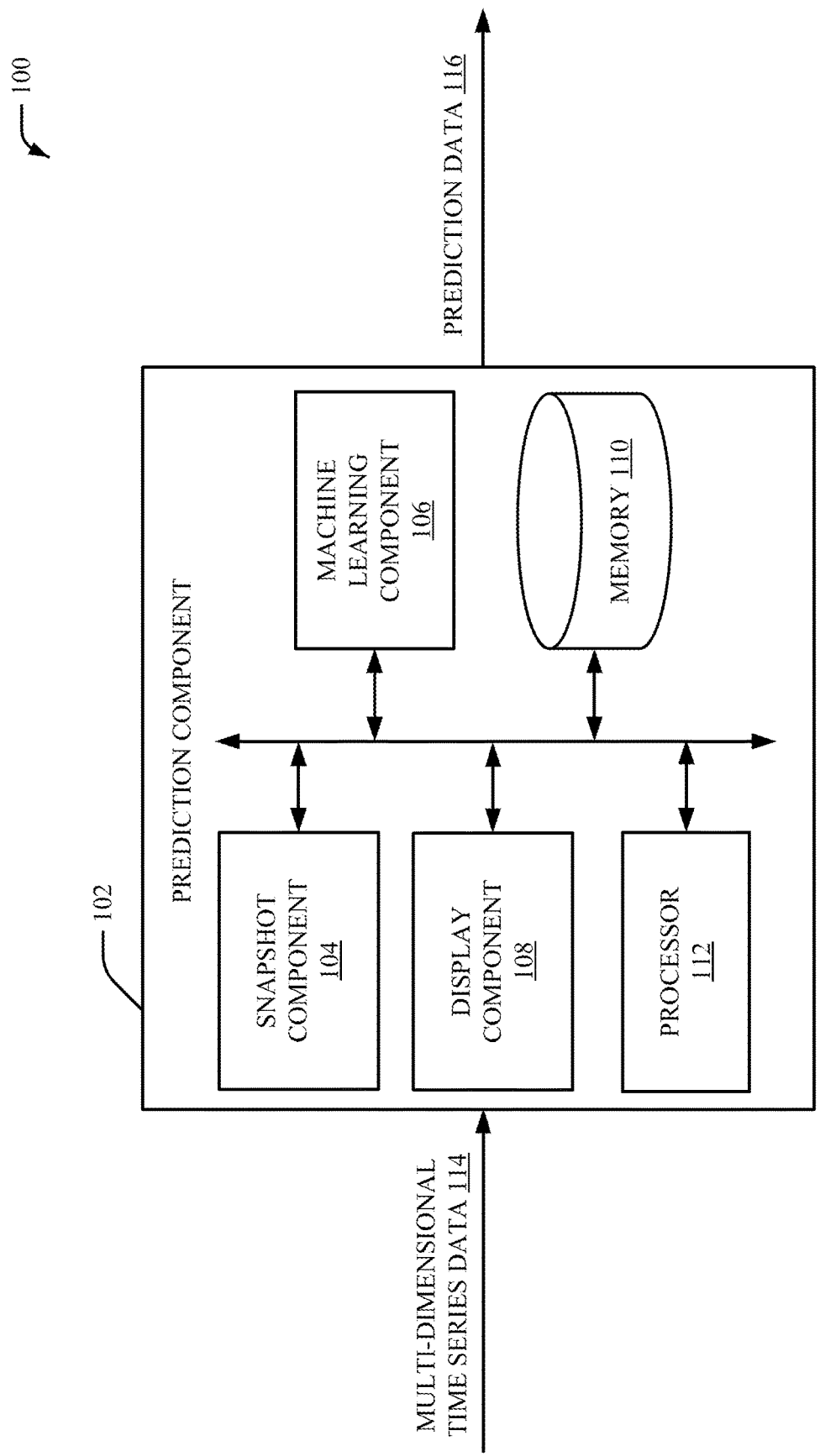
FIG. 1 illustrates a block diagram of an example, non-limiting system to facilitate machine learning associated with multi-dimensional time series data in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With the recent advancement in computing technologies and digital electronics, digital data is being generated and consumed at an increasing rate. Often times digital data is formatted as time series data. Time series data can be a sequence of data that is repeatedly generated and/or captured by a device (e.g., a computing device) at a plurality of time values during a certain time interval. Digital data can also be formatted as various data types. However, the vast amount of digital data generated and/or captured by various devices makes it difficult to manage, process and/or analyze digital data for digital technologies.

Embodiments described herein include systems, computer-implemented methods, and computer program products that facilitate machine learning associated with multi-dimensional time series data. For example, one or more events associated with multi-dimensional time series data can be predicted via one or more convolutional neural networks. As used herein, "multi-dimensional time series data" can be a sequence of data associated with at least two different data types that is repeatedly generated and/or captured at a plurality of time values during a certain time interval. In an aspect, sequences of multi-dimensional time series data can be generated based on the multi-dimensional time series data. In an embodiment, the sequences of multi-dimensional time series data can be formatted as a data matrix. The sequences of multi-dimensional time series data (e.g., the data matrix associated with the sequences of multi-dimensional time series data) can be provided as input to a convolutional neural network system. The convolutional neural network system can process and/or analyze the sequences of multi-dimensional time series data (e.g., the data matrix associated with the sequences of multi-dimensional time series data) to facilitate learning and/or one or more predictions associated with the multi-dimensional time series data. For instance, the convolutional neural network system can generate prediction data associated with one or more predictions for one or more events associated with the multi-dimensional time series data. In one embodiment, a system can comprise a snapshot feature (e.g., a snapshot component) that can generate multiple sequences of multi-dimensional time series data (e.g., multiple sequences of high-dimensional time series data) associated with at least two different data types generated by a data system over a consecutive period of time. Additionally or alternatively, the system can comprise a machine learning feature (e.g., a machine learning component) that can analyze multiple sequences of multi-dimensional time series data (e.g., multiple sequences of high-dimensional time series data) using a convolutional neural network system to predict an event associated with the multi-dimensional time series data.

In certain embodiments, the sequences of multi-dimensional time series data (e.g., the data matrix associated with the sequences of multi-dimensional time series data) can be tuned based on the prediction data generated by the convolutional neural network system. For example, a size of the sequences of multi-dimensional time series data (e.g., a size of the data matrix associated with the sequences of multi-dimensional time series data) can be modified based on prediction data generated by the convolutional neural network system. Additionally or alternatively, one or more characteristics associated with the convolutional neural network system can be can be tuned based on the prediction data generated by the convolutional neural network system. For example, a number of layers for a convolutional neural network associated with the convolutional neural network system can be modified, a dropout rate for a convolutional neural network associated with the convolutional neural network system can be modified, number of filters for a convolutional neural network associated with the convolutional neural network system can be modified, a filter size for a convolutional neural network associated with the convolutional neural network system can be modified, and/or one or more other characteristics for a convolutional neural network associated with the convolutional neural network system can be modified. Accordingly, performance for predicting an event associated with multi-dimensional time series data and/or accuracy for predicting an event associated with multi-dimensional time series data can be improved. Furthermore, an amount of data employed by a machine learning system and/or a degree of dimensionality for data employed by a machine learning system can be improved. Moreover, processing time and/or an amount of processing for predicting an event associated with multi-dimensional time series data can be reduced. Efficiency and/or performance of one or more processors that execute a machine learning process associated with multi-dimensional time series data can also be improved.

FIG. 1 illustrates a block diagram of an example, non-limiting system 100 that facilitates machine learning associated with multi-dimensional time series data in accordance with one or more embodiments described herein. In various embodiments, the system 100 can be a machine learning system associated with technologies such as, but not limited to, digital technologies, machine learning technologies, time series data technologies, multi-dimensional time series data technologies, data analysis technologies, data classification technologies, data clustering technologies, medical device technologies, collaborative filtering technologies, recommendation system technologies, signal processing technologies, word embedding technologies, topic model technologies, image processing technologies, video processing technologies, audio processing technologies, digital financial technologies, digital banking technologies, digital option trading technologies, digital business technologies, and/or other digital technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a prediction component, etc.) for carrying out defined tasks related to machine learning. The system 100 and/or components of the system can be employed to solve new problems that arise through advancements in technologies mentioned above, employment of time series data, machine learning process and/or computer architecture, and the like. One or more embodiments of the system 100 can provide technical improvements to digital systems, time series data systems, multi-dimensional time series data systems, machine learning systems, artificial intelligence systems, data analysis systems, data analytics systems, data classification systems, data clustering systems, medical device systems, collaborative filtering systems, recommendation systems, signal processing systems, word embedding systems, topic model systems, image processing systems, video processing systems, digital financial systems, digital banking systems, digital option trading systems, digital business systems and/or other digital systems. One or more embodiments of the system 100 can also provide technical improvements to a processing unit (e.g., a processor) associated with a machine learning process by improving processing performance of the processing unit, reducing computing bottlenecks of the processing unit, improving processing efficiency of the processing unit, and/or reducing an amount of time for the processing unit to perform the machine learning process.

In the embodiment shown in FIG. 1, the system 100 can include a prediction component 102. As shown in FIG. 1, the prediction component 102 can include a snapshot component 104, a machine learning component 106, and a display component 108. Aspects of the prediction component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the prediction component 102 can also include memory 110 that stores computer executable components and instructions. Furthermore, the prediction component 102 can include a processor 112 to facilitate execution of the instructions (e.g., computer executable components and corresponding instructions) by the prediction component 102. As shown, the snapshot component 104, the machine learning component 106, the display component 108, the memory 110 and/or the processor 112 can be electrically and/or communicatively coupled to one another in one or more embodiments.

The prediction component 102 (e.g., the snapshot component 104 of the prediction component 102) can receive multi-dimensional time series data 114. The multi-dimensional time series data 114 can include one or more streams of time series data. The multi-dimensional time series data 114 can also be generated and/or transmitted to the prediction component 102 (e.g., the snapshot component 104 of the prediction component 102) over a consecutive period of time. As used herein, "time series data" can be a sequence of data that is repeatedly generated and/or captured at a plurality of time values during a certain time interval. Furthermore, as used herein, "multi-dimensional time series data" can be time series data that is associated with at least two different data types. In an embodiment, the multi-dimensional time series data 114 can be raw multi-dimensional time series data (e.g., unprocessed multi-dimensional time series data). In another embodiment, the multi-dimensional time series data 114 can be pre-processed multi-dimensional time series data. Moreover, the multi-dimensional time series data 114 can include, but is not limited to, any number of different types of multi-dimensional time series data such as numerical data, textual data, transaction data, user behavior data (e.g., call data, web login data, other user behavior data, etc.), analytical data, market indicator data, demographic data, variable data, y-response data, simulation data, structure mapping engine data, and/or other data.

The snapshot component 104 can generate a plurality of sequences of multi-dimensional time series data from the multi-dimensional time series data 114. For instance, the snapshot component 104 can generate at least a first sequence of multi-dimensional time series data and a second sequence of multi-dimensional time series data from the multi-dimensional time series data 114. The plurality of sequences of multi-dimensional time series data generated by the snapshot component 104 can be a set of multi-dimensional observations that includes both dynamic data and static data associated with the multi-dimensional time series data 114. Dynamic data can be data from the multi-dimensional time series data 114 that is modified one or more times. Dynamic data can also comprise a time dependency with one or more other data elements included in the multi-dimensional time series data 114. Furthermore, dynamic data can be data that is related to other data included in the multi-dimensional time series data 114. Static data can be data from the multi-dimensional time series data 114 that is not modified once included in the multi-dimensional time series data 114. Furthermore, a sequence of multi-dimensional time series data can include consecutive multi-dimensional time series data over a over a consecutive period of time. In an embodiment, the snapshot component 104 can generate a data matrix associated with the plurality of sequences of multi-dimensional time series data. For example, data elements of the data matrix can correspond to data elements of the multi-dimensional time series data 114.

In an aspect, a portion of a first sequence of multi-dimensional time series data from the plurality of sequences of multi-dimensional time series data can correspond to a second sequence of multi-dimensional time series data from the plurality of sequences of multi-dimensional time series data. For instance, the first sequence of multi-dimensional time series data and the second sequence of multi-dimensional time series data can include corresponding time series data and different time series data. The first sequence of multi-dimensional time series data can correspond to a first interval of time associated with the multi-dimensional time series data 114, and the second sequence of multi-dimensional time series data can correspond to a second interval of time associated with the multi-dimensional time series data 114. In one example, the second interval of time associated with the second sequence of multi-dimensional time series data can begin during the first interval of time associated with the first sequence of multi-dimensional time series data. Furthermore, the second interval of time associated with the second sequence of multi-dimensional time series data can end after the first interval of time associated with the first sequence of multi-dimensional time series data. The first interval of time associated with the first sequence of multi-dimensional time series data and/or the second interval of time associated with the second sequence of multi-dimensional time series data can correspond to, for example, year(s), month(s), week(s), day(s), minute(s) and/or second(s). In a non-limiting example, an interval of time for the first sequence of multi-dimensional time series data and/or the second sequence of multi-dimensional time series data (e.g., sequences of multi-dimensional time series data from the plurality of sequences of multi-dimensional time series data) can correspond to a four week time interval. In another non-limiting example, an interval of time for the first sequence of multi-dimensional time series data and/or the second sequence of multi-dimensional time series data (e.g., sequences of multi-dimensional time series data from the plurality of sequences of multi-dimensional time series data) can correspond to a three month time interval. In yet another non-limiting example, an interval of time for the first sequence of multi-dimensional time series data and/or the second sequence of multi-dimensional time series data (e.g., sequences of multi-dimensional time series data from the plurality of sequences of multi-dimensional time series data) can correspond to a two day time interval. However, it is to be appreciated that an interval of time for the first sequence of multi-dimensional time series data and/or the second sequence of multi-dimensional time series data (e.g., sequences of multi-dimensional time series data from the plurality of sequences of multi-dimensional time series data) can correspond to a different time interval.

In an aspect, the snapshot component 104 can determine a size of sequences from the plurality of sequences of multi-dimensional time series data (e.g., the first sequence of multi-dimensional time series data and the second sequence of multi-dimensional time series data) based on characteristics associated with the multi-dimensional time series data 114. Characteristics associated with the multi-dimensional time series data 114 can include, for example, a length of the multi-dimensional time series data 114, a type of data associated with the multi-dimensional time series data 114, a number of different data types associated with the multi-dimensional time series data 114, a type of device that generates the multi-dimensional time series data 114, a user identity associated with the multi-dimensional time series data 114, and/or one or more other characteristics associated with the multi-dimensional time series data 114. In certain embodiments, the snapshot component 104 can pre-process the multi-dimensional time series data 114 prior to generating the plurality of sequences of multi-dimensional time series data (e.g., the first sequence of multi-dimensional time series data and the second sequence of multi-dimensional time series data). For example, a pre-process associated with the multi-dimensional time series data 114 can include, but is not limited to, removing data elements from the multi-dimensional time series data 114 that correspond a certain value (e.g., a '0' value or a 'NA' value), filling in missing values for empty data elements associated with the multi-dimensional time series data 114 (e.g., filling missing values with a '−1' or '0'), adding a time value to data elements associated with the multi-dimensional time series data 114, removing a time value from data elements associated with the multi-dimensional time series data 114, modifying one or more data elements associated with the multi-dimensional time series data 114, normalizing one or more data elements the multi-dimensional time series data 114, etc.

The machine learning component 106 can analyze and/or process the plurality of sequences of multi-dimensional time series data (e.g., the first sequence of multi-dimensional time series data and the second sequence of multi-dimensional time series data). In an embodiment, the machine learning component 106 can analyze and/or process the plurality of sequences of multi-dimensional time series data (e.g., the first sequence of multi-dimensional time series data and the second sequence of multi-dimensional time series data) using a convolutional neural network system to predict an event associated with the multi-dimensional time series data 114. The convolutional neural network system can include one or more convolutional neural networks. A convolutional neural network (e.g., the convolutional neural network system) employed by the machine learning component 106 can be an artificial neural network associated with feed-forward digital processing that analyzes and/or processes the plurality of sequences of multi-dimensional time series data (e.g., the first sequence of multi-dimensional time series data and the second sequence of multi-dimensional time series data) using two or more levels layers of processing. In an aspect, a convolutional neural network employed by the machine learning component 106 can be associated with interconnected deep learning that provides an estimated functional model based on the plurality of sequences of multi-dimensional time series data (e.g., the first sequence of multi-dimensional time series data and the second sequence of multi-dimensional time series data).

In another aspect, a convolutional neural network employed by the machine learning component 106 can be a digital system of processing units that are connected together similar to biological neurons of a biological brain. For instance, a first processing unit of a convolutional neural network employed by the machine learning component 106 can generate first output data based on digital data associated with the plurality of sequences of multi-dimensional time series data. The first output data generated by the first processing unit can be processed by a second processing unit of the convolutional neural network employed by the machine learning component 106. The second processing unit of the convolutional neural network employed by the machine learning component 106 can also generate second output data based on the first output data. The second output data generated by the second processing unit can be processed by a third processing unit of the convolutional neural network employed by the machine learning component 106, etc. In an aspect, the convolutional neural network (e.g., the convolutional neural network system) employed by the machine learning component 106 can be associated with nonlinear processing of features associated with the plurality of sequences of multi-dimensional time series data (e.g., the first sequence of multi-dimensional time series data and the second sequence of multi-dimensional time series data). For instance, the convolutional neural network (e.g., the convolutional neural network system) employed by the machine learning component 106 can facilitate automated extraction of data representations (e.g., features) from the plurality of sequences of multi-dimensional time series data (e.g., the first sequence of multi-dimensional time series data and the second sequence of multi-dimensional time series data). In an embodiment, the convolutional neural network (e.g., the convolutional neural network system) employed by the machine learning component 106 can analyze and/or process the data matrix associated with the plurality of sequences of multi-dimensional time series data (e.g., the first sequence of multi-dimensional time series data and the second sequence of multi-dimensional time series data). For instance, the data matrix associated with the plurality of sequences of multi-dimensional time series data (e.g., the first sequence of multi-dimensional time series data and the second sequence of multi-dimensional time series data) can be employed as input data for a convolutional neural network process performed by the convolutional neural network (e.g., the convolutional neural network system) associated with the machine learning component. In another aspect, the machine learning component 106 can analyze and/or process the plurality of sequences of multi-dimensional time series data (e.g., the first sequence of multi-dimensional time series data and the second sequence of multi-dimensional time series data) using a parallel network of processing units and/or processors associated with the convolutional neural network system. For example, a first portion of the plurality of sequences of multi-dimensional time series data can be processed in parallel to a first portion of the plurality of sequences of multi-dimensional time series data.

In another embodiment, the machine learning component 106 can generate prediction data 116 based on the plurality of sequences of multi-dimensional time series data (e.g., the first sequence of multi-dimensional time series data and the second sequence of multi-dimensional time series data) associated with the convolutional neural network system. For instance, the prediction data 116 can include a prediction for an event associated with the multi-dimensional time series data 114. In yet another embodiment, the machine learning component 106 can determine a set of parameters for the convolutional neural network system based on the characteristics associated with the multi-dimensional time series data 114. For example, the machine learning component 106 can determine a number of layers for a convolutional neural network, a number of hidden layers for a convolutional neural network, a dropout rate for a convolutional neural network, a number of filters for a convolutional neural network, a size of a filter for a convolutional neural network, a type of filter for a convolutional neural network, and/or one or more other parameters associated with a convolutional neural network. In yet another embodiment, the snapshot component 104 can generate the plurality of sequences of multi-dimensional time series data (e.g., the first sequence of multi-dimensional time series data and the second sequence of multi-dimensional time series data) based on feedback data indicative of information for tuning the plurality of sequences of multi-dimensional time series data (e.g., the first sequence of multi-dimensional time series data and the second sequence of multi-dimensional time series data). For example, the feedback data employed by the snapshot component 104 can include a tuning value for a size (e.g., a interval of time) for a sequence of multi-dimensional time series data from the plurality of sequences of multi-dimensional time series data (e.g., a tuning value for a size of the first sequence of multi-dimensional time series data and/or the second sequence of multi-dimensional time series data). Additionally or alternatively, the machine learning component 106 can adjust the convolutional neural network system based on feedback data indicative of information for tuning the convolutional neural network system. For example, the feedback data employed by the machine learning component 106 can include a tuning value for the set of parameters for the convolutional neural network system such as, for example, a tuning value for a number of layers for a convolutional neural network, a tuning value for a number of hidden layers for a convolutional neural network, a tuning value for a dropout rate for a convolutional neural network, a tuning value for a number of filters for a convolutional neural network, a tuning value for a size of a filter for a convolutional neural network, a tuning value for a type of filter for a convolutional neural network, and/or a tuning value for one or more other parameters associated with a convolutional neural network. In an aspect, the feedback data employed by the snapshot component 104 and/or the machine learning component 106 can be generated based on the prediction data 116.

In certain embodiments, the display component 108 can generate a user interface to display at least a portion of the prediction data 116 in a human interpretable format. For example, the display component 108 can generate a user interface to display, in a human interpretable format, output data associated with the event included in the prediction data 116. As such, the prediction component 102 can provide improved prediction capability associated with the prediction data 116. For example, accuracy of the event included in the prediction data 116, classification of the event included in the prediction data 116 can be improved, and/or other performance metrics of the prediction capability associated with the prediction data 116 can be improved. Furthermore, the prediction component 102 can process and/or analyze a greater quantity of time series data as compared to other prediction systems. The prediction component 102 can also process time series data with greater dimensionality and/or with improved flexibility as compared to other prediction systems. Additionally, the prediction component 102 can process and/or analyze time series data associated with a greater level of complexity as compared to other prediction systems. Moreover, performance of a processor (e.g., the processor 112) with respect to a machine learning process (e.g., a speed for performing machine learning and/or an amount of memory employed for machine learning) can be improved by employing the prediction component 102 to analyze and/or process time series data. Processing capability of a processor (e.g., the processor 112) associated with a machine learning process can also be improved by employing the prediction component 102 to analyze and/or process time series data.

It is to be appreciated that the prediction component 102 (e.g., the snapshot component 104, the machine learning component 106 and/or the display component 108) performs a machine learning process associated with multi-dimensional time series data (e.g., multi-dimensional time series data 114) that cannot be performed by a human (e.g., is greater than the capability of a single human mind). For example, an amount of multi-dimensional time series data processed, a speed of processing of multi-dimensional time series data and/or data types of the multi-dimensional time series data processed by the prediction component 102 (e.g., the snapshot component 104, the machine learning component 106 and/or the display component 108) over a certain period of time can be greater, faster and different than an amount, speed and data type that can be processed by a single human mind over the same period of time. The prediction component 102 (e.g., the snapshot component 104, the machine learning component 106 and/or the display component 108) can also be fully operational towards performing one or more other functions (e.g., fully powered on, fully executed, etc.) while also performing the above-referenced machine learning process. Moreover, prediction data (e.g., prediction data 116) generated by the prediction component 102 (e.g., the snapshot component 104, the machine learning component 106 and/or the display component 108) can include information that is impossible to obtain manually by a user. For example, an amount of information included in the prediction data (e.g., prediction data 116) and/or a variety of information included in the prediction data (e.g., prediction data 116) can be more complex than information obtained manually by a user.

Figure 2:
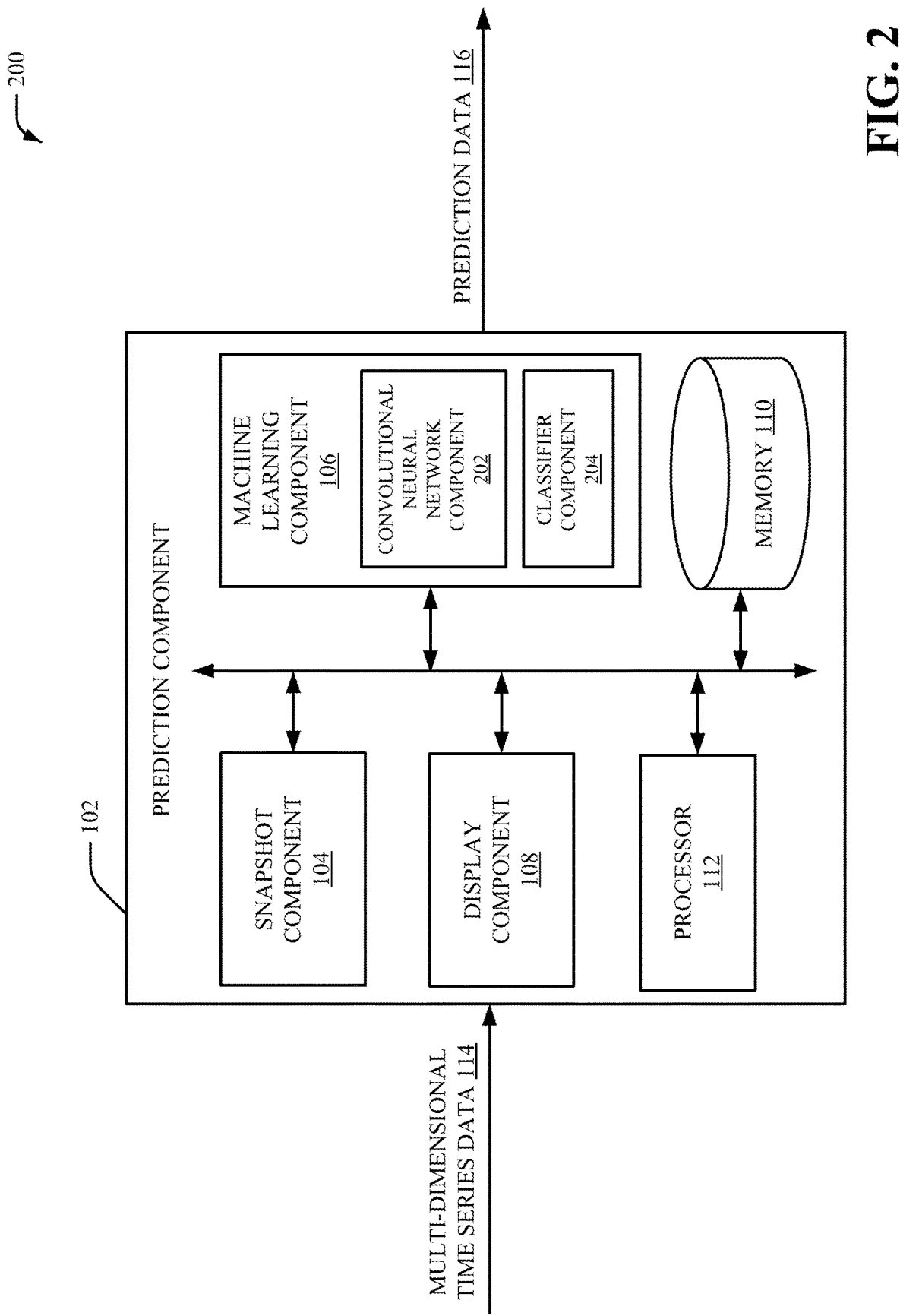
FIG. 2 illustrates a block diagram of another example, non-limiting system to facilitate machine learning associated with multi-dimensional time series data in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the prediction component 102. The prediction component 102 can include the snapshot component 104, the machine learning component 106, and the display component 108. As shown in FIG. 2, the machine learning component 106 can include a convolutional neural network component 202 and a classifier component 204.

The convolutional neural network component 202 can employed to learn behavior, characteristics and/or inferences associated with the plurality of sequences of multi-dimensional time series data (e.g., the first sequence of multi-dimensional time series data and the second sequence of multi-dimensional time series data). For example, the convolutional neural network component 202 can apply one or more convolutional neural networks to the plurality of sequences of multi-dimensional time series data (e.g., the first sequence of multi-dimensional time series data and the second sequence of multi-dimensional time series data). In an aspect, the convolutional neural network component 202 can perform nonlinear feature representation learning with respect to the plurality of sequences of multi-dimensional time series data (e.g., the first sequence of multi-dimensional time series data and the second sequence of multi-dimensional time series data). For example, a convolutional neural network system associated with the convolutional neural network component 202 can perform nonlinear processing of features associated with the plurality of sequences of multi-dimensional time series data (e.g., the first sequence of multi-dimensional time series data and the second sequence of multi-dimensional time series data). In an aspect, the convolutional neural network component 202 can transform the plurality of sequences of multi-dimensional time series data (e.g., the first sequence of multi-dimensional time series data and the second sequence of multi-dimensional time series data) into learned features to be employed by the classifier component 204. In an embodiment, the convolutional neural network component 202 can employ a first convolutional neural network that is coupled to a second first convolutional neural network. For instance, the convolutional neural network component 202 can include two fully connected neural networks that process and/or analyze the plurality of sequences of multi-dimensional time series data (e.g., the first sequence of multi-dimensional time series data and the second sequence of multi-dimensional time series data) using one or more convolutional neural network techniques associated with one or more filters and/or one or more layers of processing.

The classifier component 204 can classify data associated with the learned features determined by the convolutional neural network component 202. In an embodiment, the classifier component 204 can extract information that is indicative of classifications, correlations, inferences and/or expressions from the plurality of sequences of multi-dimensional time series data (e.g., the first sequence of multi-dimensional time series data and the second sequence of multi-dimensional time series data) based on principles of artificial intelligence. The classifier component 204 can also employ an automatic classification system and/or an automatic classification process to facilitate analysis of the plurality of sequences of multi-dimensional time series data (e.g., the first sequence of multi-dimensional time series data and the second sequence of multi-dimensional time series data). For example, the classifier component 204 can employ a probabilistic and/or statistical-based analysis (e.g., factoring into the analysis utilities and costs) to learn and/or generate inferences with respect to the plurality of sequences of multi-dimensional time series data (e.g., the first sequence of multi-dimensional time series data and the second sequence of multi-dimensional time series data).

In an aspect, the classifier component 204 can include an inference component (not shown) that can further enhance automated aspects of the classifier component 204 utilizing in part inference based schemes to facilitate learning and/or generating inferences for the plurality of sequences of multi-dimensional time series data (e.g., the first sequence of multi-dimensional time series data and the second sequence of multi-dimensional time series data). The classifier component 204 can employ any suitable machine-learning based techniques, statistical-based techniques and/or probabilistic-based techniques. For example, the classifier component 204 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the classifier component 204 can perform a set of machine learning computations associated with analysis of the plurality of sequences of multi-dimensional time series data (e.g., the first sequence of multi-dimensional time series data and the second sequence of multi-dimensional time series data). For example, the machine learning component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 3:
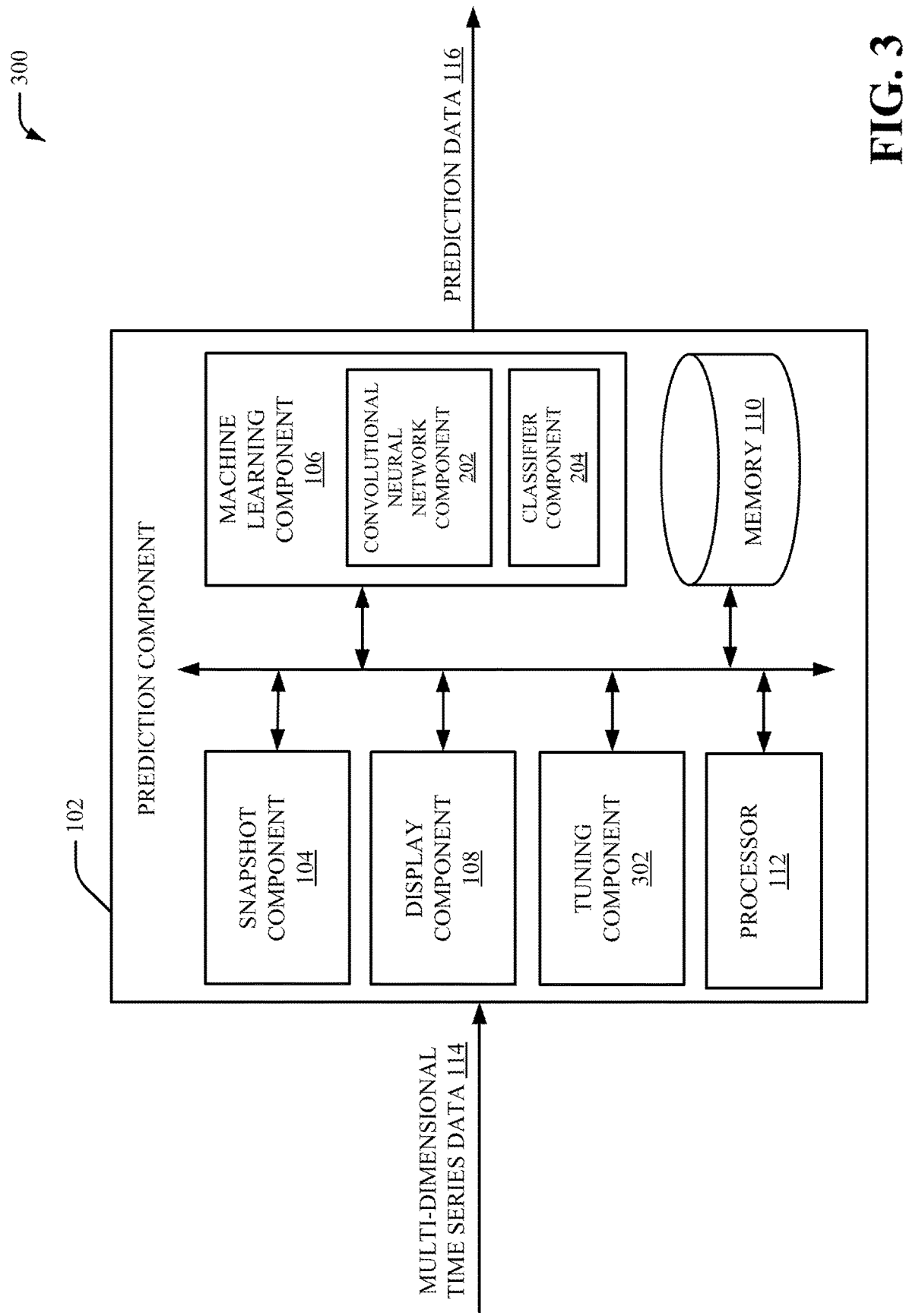
FIG. 3 illustrates a block diagram of yet another example, non-limiting system to facilitate machine learning associated with multi-dimensional time series data in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the prediction component 102. The prediction component 102 can include the snapshot component 104, the machine learning component 106, the display component 108, and a tuning component 302. In an embodiment, the machine learning component 106 can include the convolutional neural network component 202 and the classifier component 204.

The tuning component 302 can employ information generated by the machine learning component 106 to tune the plurality of sequences of multi-dimensional time series data (e.g., the first sequence of multi-dimensional time series data and the second sequence of multi-dimensional time series data). For instance, the tuning component 302 can tune the plurality of sequences of multi-dimensional time series data (e.g., the first sequence of multi-dimensional time series data and the second sequence of multi-dimensional time series data) based on the prediction data 116. In an aspect, the tuning component 302 can tune a size (e.g., a interval of time) for a sequence of multi-dimensional time series data from the plurality of sequences of multi-dimensional time series data (e.g., tune a size of the first sequence of multi-dimensional time series data and/or the second sequence of multi-dimensional time series data). In another aspect, the tuning component 302 can tune a size (e.g., a interval of time) of a data matrix associated with the plurality of sequences of multi-dimensional time series data (e.g., a data matrix associated with the first sequence of multi-dimensional time series data and the second sequence of multi-dimensional time series data). However, it is to be appreciated that the tuning component 302 can additionally or alternatively tune one or more other characteristics associated with the plurality of sequences of multi-dimensional time series data and/or the data matrix associated with the plurality of sequences of multi-dimensional time series data.

Additionally or alternatively, the tuning component 302 can employ information generated by the machine learning component 106 to tune the convolutional neural network system associated with the machine learning component 106 (e.g., the convolutional neural network component 202). For instance, the tuning component 302 can to tune the convolutional neural network system associated with the machine learning component 106 (e.g., the convolutional neural network component 202) based on the prediction data 116. In an aspect, the tuning component 302 can tune a number of layers for the convolutional neural network system associated with the machine learning component 106 (e.g., the convolutional neural network component 202), a number of hidden layers for the convolutional neural network system associated with the machine learning component 106 (e.g., the convolutional neural network component 202), a dropout rate for the convolutional neural network system associated with the machine learning component 106 (e.g., the convolutional neural network component 202), a number of filters for the convolutional neural network system associated with the machine learning component 106 (e.g., the convolutional neural network component 202), a size of a filter for the convolutional neural network system associated with the machine learning component 106 (e.g., the convolutional neural network component 202), a type of filter for the convolutional neural network system associated with the machine learning component 106 (e.g., the convolutional neural network component 202), and/or one or more other parameters associated with the convolutional neural network system associated with the machine learning component 106 (e.g., the convolutional neural network component 202).

Figure 4:
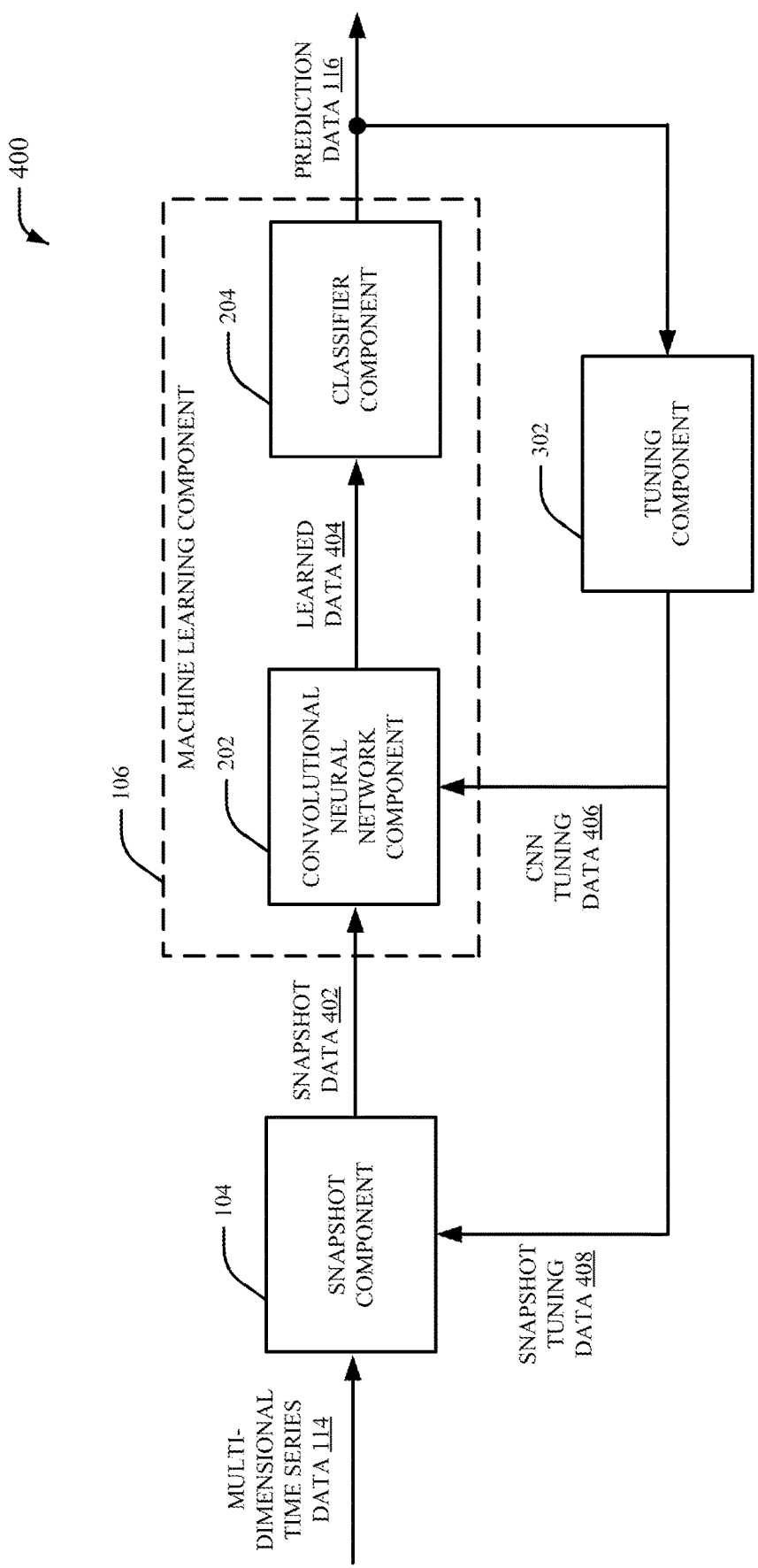
FIG. 4 illustrates a block diagram of an example, non-limiting system to facilitate tuning associated with a convolutional neural network system in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 can illustrate a machine learning process associated with multi-dimensional time series event prediction via one or more convolutional neural networks. The system 400 includes the snapshot component 104, the machine learning component 106 (e.g., the convolutional neural network component 202 and the classifier component 204) and the tuning component 302. As shown in FIG. 4, the snapshot component 104 can receive the multi-dimensional time series data 114. The snapshot component 104 can generate snapshot data 402 based on the multi-dimensional time series data 114. The snapshot data 402 can include, for example, the plurality of sequences of multi-dimensional time series data (e.g., the first sequence of multi-dimensional time series data and the second sequence of multi-dimensional time series data). The snapshot component 104 can also provide the snapshot data 402 to the machine learning component 106. For instance, the convolutional neural network component 202 of the machine learning component 106 can receive the snapshot data 402. In some embodiments, the snapshot data 402 be, for example, input data employed for a convolutional neural network process associated with a convolutional neural network system of the convolutional neural network component 202. For example, the snapshot data 402 can be a set of inputs for output data (e.g., a machine learning model, a neural network model, etc.) generated by a convolutional neural network system of the convolutional neural network component 202.

The convolutional neural network component 202 can analyze and/or process the snapshot data 402. For instance, the snapshot data 402 can be provided as input to one or more convolutional neural networks executed by the convolutional neural network component 202. Based on the snapshot data 402, the convolutional neural network component 202 can generate learned data 404. The learned data 404 can include information associated with one or more learned features, learned correlations, learned inferences and/or learned expressions from the snapshot data 402. The classifier component 204 can classify the one or more learned features, learned correlations, learned inferences and/or learned expressions associated with the learned data 404. The prediction data 116 generated by the classifier component 204 can include classification of the one or more learned features, learned correlations, learned inferences and/or learned expressions associated with the learned data 404. In an embodiment, the tuning component 302 can receive the prediction data 116. Based on the prediction data 116, the tuning component 302 can generate CNN tuning data 406 for the convolutional neural network component 202. The CNN tuning data 406 can include, for example, a number of layers for the convolutional neural network system associated with the machine learning component 106 (e.g., the convolutional neural network component 202), a number of hidden layers for the convolutional neural network system associated with the machine learning component 106 (e.g., the convolutional neural network component 202), a dropout rate for the convolutional neural network system associated with the machine learning component 106 (e.g., the convolutional neural network component 202), a number of filters for the convolutional neural network system associated with the machine learning component 106 (e.g., the convolutional neural network component 202), a size of a filter for the convolutional neural network system associated with the machine learning component 106 (e.g., the convolutional neural network component 202), a type of filter for the convolutional neural network system associated with the machine learning component 106 (e.g., the convolutional neural network component 202), and/or one or more other parameters associated with the convolutional neural network system associated with the machine learning component 106 (e.g., the convolutional neural network component 202). Additionally or alternatively, based on the prediction data 116, the tuning component 302 can generate snapshot tuning data 408 for the snapshot component 104. The snapshot tuning data 408 can include, for example, a size (e.g., a interval of time) for a sequence of multi-dimensional time series data from the plurality of sequences of multi-dimensional time series data (e.g., a size for the first sequence of multi-dimensional time series data and/or the second sequence of multi-dimensional time series data).

Figure 5:
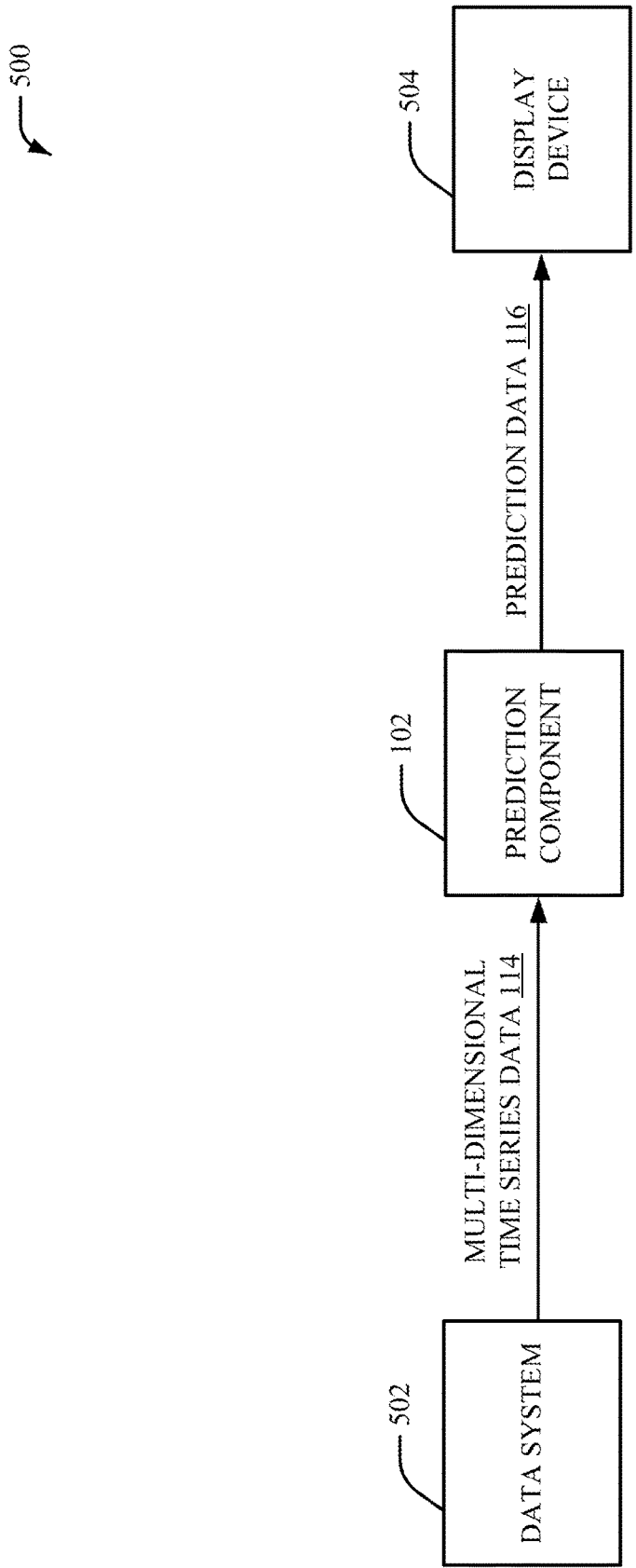
FIG. 5 illustrates an example, non-limiting system associated with multi-dimensional time series data and prediction data in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes the prediction component 102, a data system 502 and a display device 504. The data system 502 can generate and/or provide the multi-dimensional time series data 114 to the prediction component 102. The display device 504 can receive and/or render the prediction data 116 provided by the prediction component 102. In an embodiment, the data system 502 can include one or more computing devices that can generate the multi-dimensional time series data 114. In an aspect, the multi-dimensional time series data 114 generated by the data system 502 (e.g., the one or more computing devices of the data system 502) can be raw multi-dimensional time series data, compressed multi-dimensional time series data and/or processed multi-dimensional time series data. Furthermore, the multi-dimensional time series data 114 generated by the data system 502 (e.g., the one or more computing devices of the data system 502) can include, but is not limited to, any number of different types of multi-dimensional time series data such as numerical data, textual data, transaction data, user behavior data (e.g., call data, web login data, other user behavior data, etc.), analytical data, market indicator data, demographic data, variable data, y-response data, simulation data, structure mapping engine data, and/or other data. In one non-limiting example, the multi-dimensional time series data 114 generated by the data system 502 (e.g., the one or more computing devices of the data system 502) can correspond to 5.48 gigabytes of aggregated multi-dimensional time series data. In another non-limiting example, the multi-dimensional time series data 114 generated by the data system 502 (e.g., the one or more computing devices of the data system 502) can correspond to 6.23 million observations. In yet another non-limiting example, the multi-dimensional time series data 114 generated by the data system 502 (e.g., the one or more computing devices of the data system 502) can be associated with 69,820 user accounts.

The multi-dimensional time series data 114 generated by the data system 502 (e.g., the one or more computing devices of the data system 502) can be transmitted to the prediction component 102 via one or more data streams that include the multi-dimensional time series data 114. A computing device included in the data system 502 can be a hardware device that includes one or more processors. For instance, a computing device included in the data system 502 can include an electronic device, a network device, a cloud device (e.g. a cloud component) and/or another type of device that generates the multi-dimensional time series data 114 using one or more processors. In one example, the multi-dimensional time series data 114 can be computer-generated data generated in response to execution of one or more operations by the data system 502 (e.g., the one or more computing devices of the data system 502). In certain embodiments, the data system 502 (e.g., the one or more computing devices of the data system 502) can generate and transmit the multi-dimensional time series data 114 in real-time. Furthermore, in certain embodiments, at least a portion of the multi-dimensional time series data 114 can be generated by a program (e.g., software, an application, etc.) executed by the data system 502 (e.g., the one or more computing devices of the data system 502). Moreover, in certain embodiments, the data system 502 (e.g., the one or more computing devices of the data system 502) can transmit the multi-dimensional time series data 114 to the prediction component 102 via a network such as, but not limited to, a local area networks (LAN), a wide area network (WAN) such as the Internet, and/or a network that provides interconnections for devices associated with a defined workspace.

The prediction component 102 can generate and/or provide the prediction data 116 to the display device 504. The display device 504 can include a display that presents the prediction data 116. For instance, the display device 504 can present a user interface via the display. The user interface of the display device 504 can display output data associated with the prediction data 116 in a human interpretable format. In one example, the user interface of the display device 504 can display output data associated with an event included in the prediction data 116. The display device 504 can be, for example, a computing device, a computer, a desktop computer, a laptop computer, a monitor device, a smart device, a smart phone, a mobile device, a handheld device, a tablet, a wearable device, a portable computing device or another type of device associated with a display.

Figure 6:
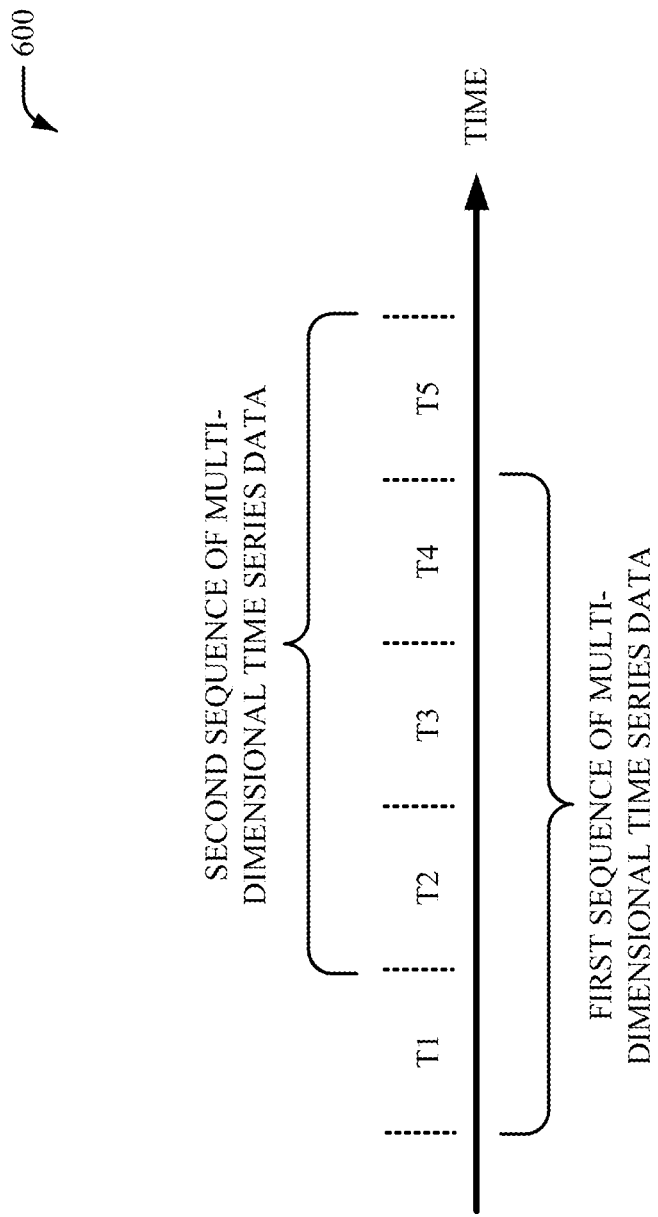
FIG. 6 illustrates an example, non-limiting system associated with sequence(s) of multi-dimensional time series data in accordance with one or more embodiments described herein.

FIG. 6 illustrates an example, non-limiting system 600 in accordance with one or more embodiments described herein. Repetitive description of like elements employed in other embodiments described herein is omitted for sake of brevity.

The system 600 illustrates an example, snapshot generation process associated with the prediction component 102 (e.g., the snapshot component 104). In a non-limiting example shown in FIG. 6, at least a portion of the multi-dimensional time series data 114 can include a first data period T1, a second data period T2, a third data period T3, a fourth data period T4 and a fifth data period T5. The first data period T1, the second data period T2, the third data period T3, the fourth data period T4 and the fifth data period T5 can correspond to, for example, a period of observation associated with an interval of time for capturing and/or generating the multi-dimensional time series data 114 via the data system 502. In an embodiment, the first data period T1, the second data period T2, the third data period T3, the fourth data period T4 and the fifth data period T5 can include a corresponding interval of time. In another embodiment, at least one data period from the first data period T1, the second data period T2, the third data period T3, the fourth data period T4 and the fifth data period T5 can be different than another data period from the first data period T1, the second data period T2, the third data period T3, the fourth data period T4 and the fifth data period T5. In one example, the first data period T1, the second data period T2, the third data period T3, the fourth data period T4 and/or the fifth data period T5 can correspond, for example, a one week interval of time. In another example, the first data period T1, the second data period T2, the third data period T3, the fourth data period T4 and the fifth data period T5 can correspond to, for example, a one week interval of time. In another example, the first data period T1, the second data period T2, the third data period T3, the fourth data period T4 and/or the fifth data period T5 can correspond, for example, a one week interval of time. In yet another example, the first data period T1, the second data period T2, the third data period T3, the fourth data period T4 and/or the fifth data period T5 can correspond to, for example, a two week interval of time. In yet another example, the first data period T1, the second data period T2, the third data period T3, the fourth data period T4 and the fifth data period T5 can correspond, for example, a one week interval of time. In yet another example, the first data period T1, the second data period T2, the third data period T3, the fourth data period T4 and/or the fifth data period T5 can correspond to, for example, a two day interval of time. In yet another example, the first data period T1, the second data period T2, the third data period T3, the fourth data period T4 and/or the fifth data period T5 can correspond, for example, a one week interval of time. In yet another example, the first data period T1, the second data period T2, the third data period T3, the fourth data period T4 and/or the fifth data period T5 can correspond to, for example, a one month interval of time. However, it is to be appreciated that the first data period T1, the second data period T2, the third data period T3, the fourth data period T4 and/or the fifth data period T5 can correspond to a different interval of time.

As shown in FIG. 6, a first sequence of multi-dimensional time data can include the first data period T1, the second data period T2, the third data period T3 and the fourth data period T4 associated with the multi-dimensional time series data 114. Furthermore, a second sequence of multi-dimensional time data can include the second data period T2, the third data period T3, the fourth data period T4 and the fifth data period T5. As such, a portion of the second sequence of multi-dimensional time data can correspond to the first sequence of multi-dimensional time data. For example, the first sequence of multi-dimensional time data and the second sequence of multi-dimensional time data can include the second data period T2, the third data period T3 and the fourth data period T4. Furthermore, a portion of the second sequence of multi-dimensional time data (e.g., the fifth data period T5) can be different than another portion of the first sequence of multi-dimensional time data (e.g., the first data period T1). In an aspect, the first sequence of multi-dimensional time data and the second sequence of multi-dimensional time data can be generated by the snapshot component 104 and/or provided to the machine learning component 106 (e.g., the convolutional neural network component 202). For instance, the snapshot data 402 can include the first sequence of multi-dimensional time data and the second sequence of multi-dimensional time data.

Figure 7:
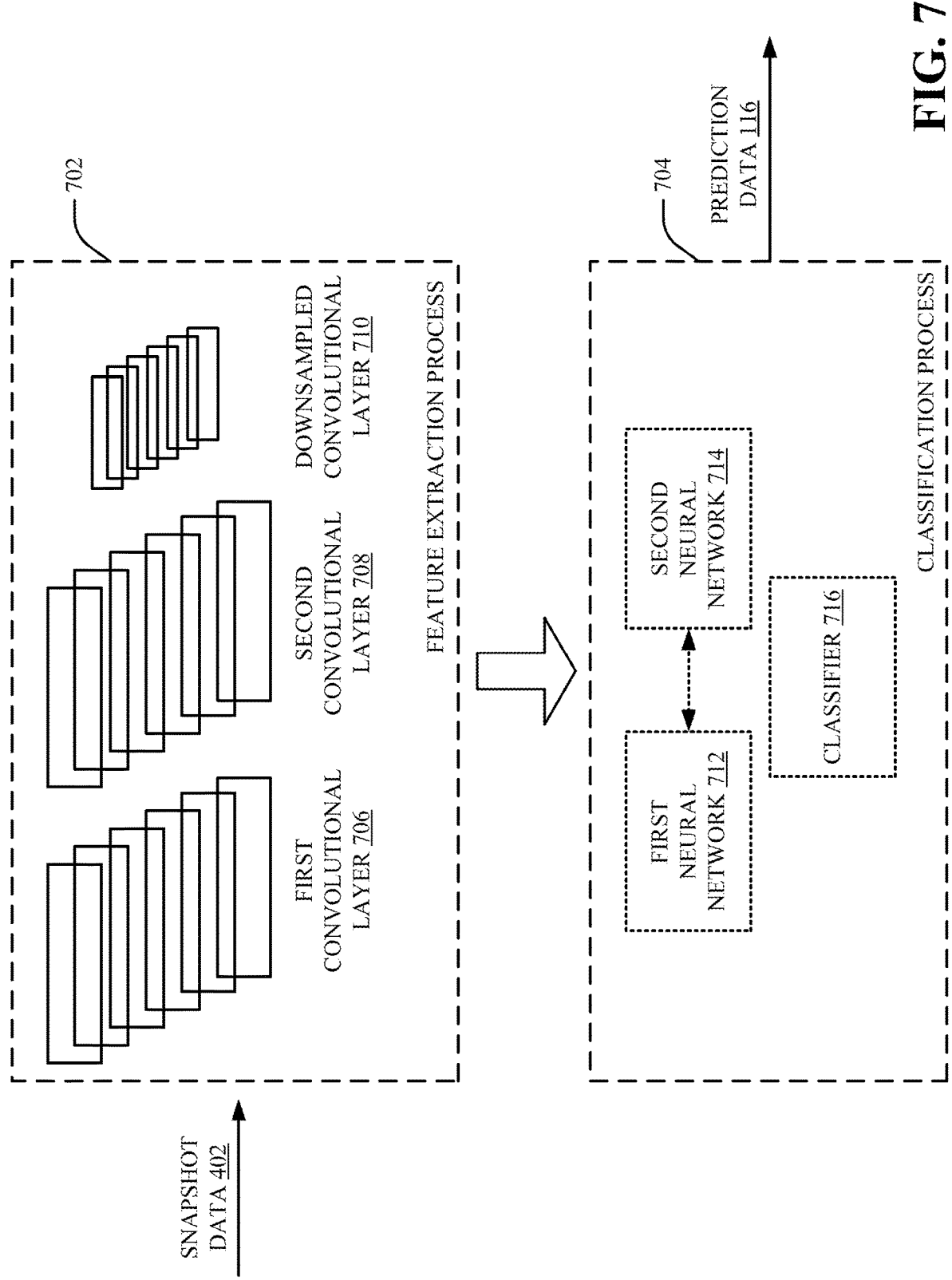
FIG. 7 illustrates an example, non-limiting system associated with a feature extraction process and a classification process in accordance with one or more embodiments described herein.

FIG. 7 illustrates an example, non-limiting system 700 in accordance with one or more embodiments described herein. Repetitive description of like elements employed in other embodiments described herein is omitted for sake of brevity.

The system 700 can be convolutional neural network system associated with the machine learning component 106 (e.g., the convolutional neural network component 202). For instance, the system 700 can be a first feed-forward artificial neural network where connections between processing units of the system 700 are connected together similar to biological neurons of a biological brain. The system 700 includes a feature extraction process 702 and a classification process 704. The feature extraction process 702 and the classification process 704 can be performed by the machine learning component 106 (e.g., the convolutional neural network component 202). The feature extraction process 702 can include a first convolutional layer 706, a second convolutional layer 708 and a downsampled convolutional layer 710.

The feature extraction process 702 can receive the snapshot data 402. The first convolutional layer 706 can determine one or more features associated with the snapshot data 402 via a first convolution analysis process. Furthermore, the second convolutional layer 708 can determine one or more other features associated with the snapshot data 402 via a second convolution analysis process. The first convolution analysis process associated with the first convolutional layer 706 can comprise one or more filters for filtering the snapshot data 402. Furthermore, second convolution analysis process associated with the second convolutional layer 708 can also comprise one or more filters for filtering the snapshot data 402. In one example, the second convolution analysis process associated with the second convolutional layer 708 can be different than the first convolution analysis process associated with the first convolutional layer 706. In another example, the second convolution analysis process associated with the second convolutional layer 708 can correspond to the first convolution analysis process associated with the first convolutional layer 706. In an aspect, at least a portion of processing performed by the first convolutional layer 706 can be shared with the second convolutional layer 708. The downsampled convolutional layer 710 can provide non-linear down sampling (e.g., maxpooling down sampling) after processing by the first convolutional layer 706 and the second convolutional layer 708. For instance, the downsampled convolutional layer 710 can reduce dimensionality of data associated with the first convolutional layer 706 and/or the second convolutional layer 708.

The classification process 704 can further process the snapshot data 402. The classification process 704 can include a first fully connected layer 712, a second fully connected layer 714 and a classifier 716. The first fully connected layer 712 can be, for example, a first fully connected neural network layer in which adjacent layers of the first fully connected layer 712 are connected to facilitate high-level reasoning. Furthermore, the second fully connected layer 714 can be, for example, a second fully connected neural network in which adjacent layers of the second fully connected layer 714 are connected to facilitate high-level reasoning.

The classifier 716 can perform classification machine learning with respect to features of the snapshot data 402 determined by the feature extraction process 702. For instance, the classifier 716 can be an automatic classification system and/or an automatic classification process that classifies features of the snapshot data 402 determined by the feature extraction process 702. In an aspect, the classifier 716 can generate at least a portion of the prediction data 116. In one example, the classifier 716 can be a binary classifier that employs binary classification to classify features of the snapshot data 402 into a first group or a second group based on a set of rules. In another example, the classifier 716 can be a multi-class classifier that employs multiclass classification to classify features of the snapshot data 402 into a group from a set of three or more groups based on a set of rules. In an embodiment, the classifier 716 can employ, for example, a support vector machine (SVM) classifier to classify features of the snapshot data 402. Additionally or alternatively, the classifier 716 can employ other classification techniques associated with Bayesian networks, decision trees and/or probabilistic classification models. Classifiers employed by the classifier 716 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class—that is, f(x)=confidence (class).

Figure 8:
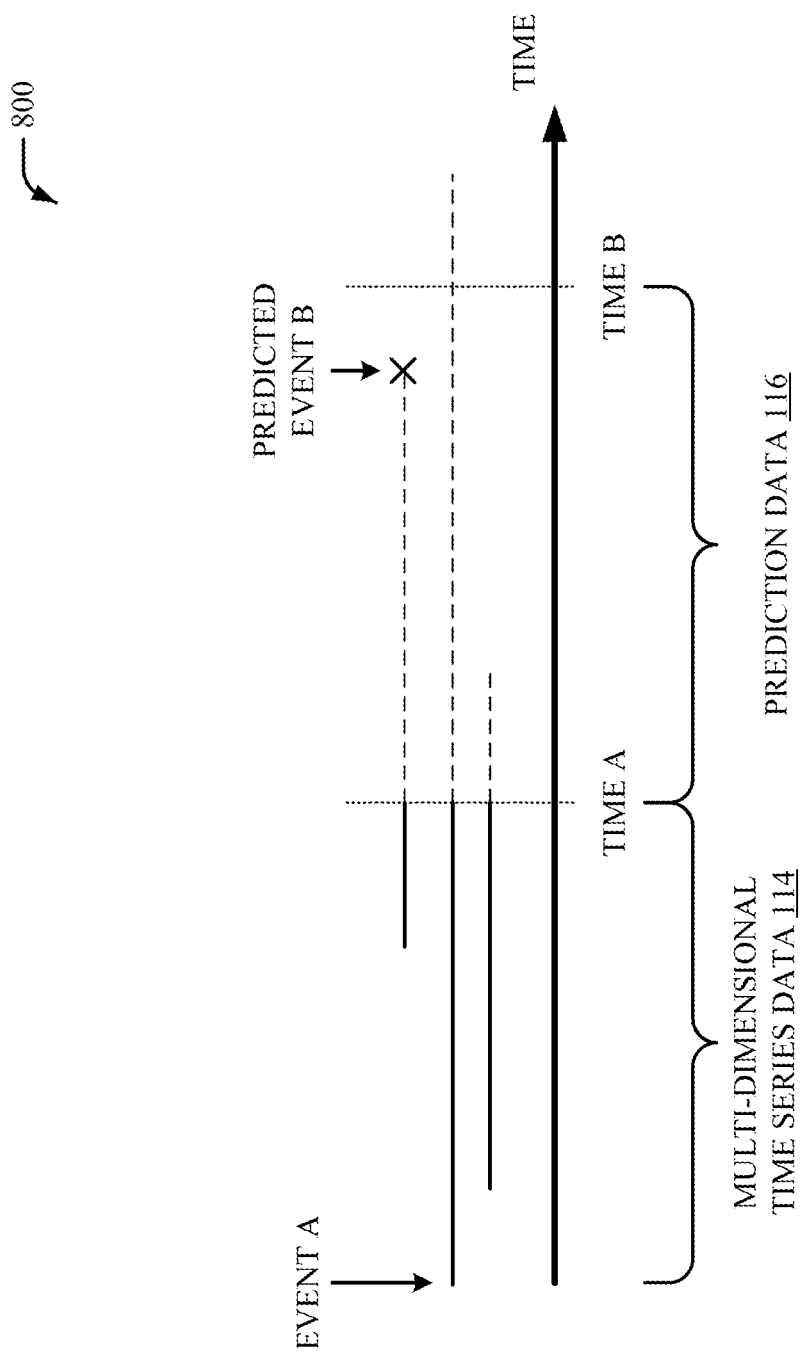
FIG. 8 illustrates an example, non-limiting system associated with a machine learning process in accordance with one or more embodiments described herein.

FIG. 8 illustrates an example, non-limiting system 800 in accordance with one or more embodiments described herein. Repetitive description of like elements employed in other embodiments described herein is omitted for sake of brevity.

The system 800 illustrates an example machine learning process associated with the prediction component 102 (e.g., the snapshot component 104, the machine learning component 106, the display component 108, the convolutional neural network component 202, the classifier component 204 and/or the tuning component 302). In a non-limiting example shown in FIG. 8, the multi-dimensional time series data 114 received by the prediction component 102 can be associated with an event A and a predicted event B that occur at different instances in time. For example, the event A can be associated with approval of an account for a user identity in a financial services system. In an aspect, the multi-dimensional time series data 114 received by the prediction component 102 can be input data for a machine learning process associated with the prediction component 102. The prediction component 102 can employ the multi-dimensional time series data 114, as more fully disclosed herein, to predict the predicted event B. For instance, the prediction data 116 generated by the prediction component 102 can include a predicted event related to the user identity and/or the financial services system. In one example, the predicted event B included in the prediction data 116 can be a prediction related to timing of a first option trade (e.g., a date for a first option trade) by the user identity. However, it is to be appreciated that the prediction component 102 can perform other types of learning and/or predictions with respect to the multi-dimensional time series data 114. For example, the multi-dimensional time series data 114 can be related to a machine learning system, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system.

Figure 9:
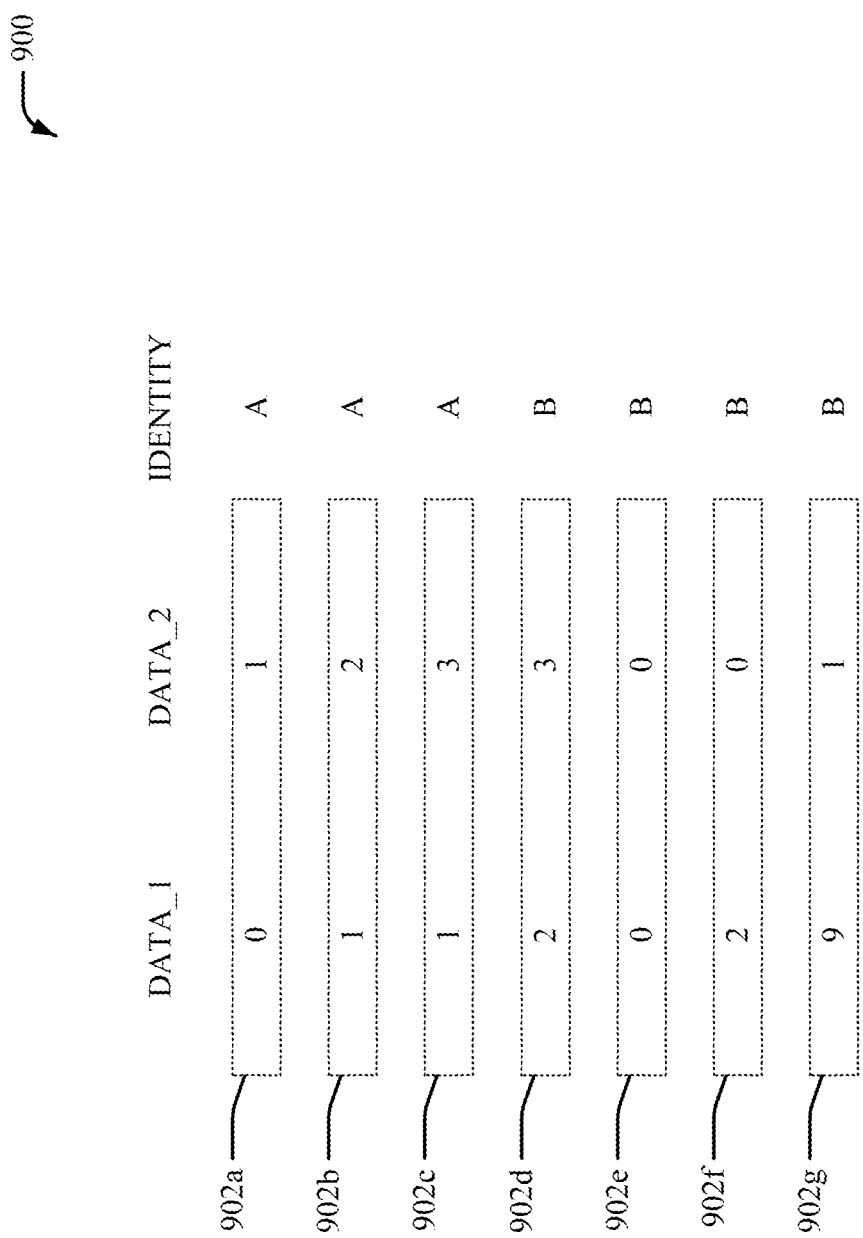
FIG. 9 illustrates example, non-limiting multi-dimensional time series data in accordance with one or more embodiments described herein.

FIG. 9 illustrates an example, non-limiting multi-dimensional time series data 900 in accordance with one or more embodiments described herein. Repetitive description of like elements employed in other embodiments described herein is omitted for sake of brevity.

The multi-dimensional time series data 900 can correspond to, for example, at least a portion of multi-dimensional time series data 114. The multi-dimensional time series data 900 can be associated with a data period 902a, a data period 902b, a data period 902c, a data period 902d, a data period 902e, a data period 902f, and a data period 902g. For instance, the data period 902a can be associated with a first observation during a first interval of time, the data period 902b can be associated with a second observation during a second interval of time, the data period 902c can be associated with a third observation during a third interval of time, the data period 902d can be associated with a fourth observation during a fourth interval of time, the data period 902e can be associated with a fifth observation during a fifth interval of time, the data period 902f can be associated with a sixth observation during a sixth interval of time, and the data period 902g can be associated with a sixth observation during a sixth interval of time. An interval of time for a data period from the data periods 902a-g can correspond to an interval of time for one or more other data periods from the data periods 902a-g. Additionally or alternatively, an interval of time for a data period from the data periods 902a-g can be different than an interval of time for one or more other data periods from the data periods 902a-g. An interval of time for at least one data period from the data periods 902a-g correspond to, for example, year(s), month(s), week(s), day(s), minute(s) and/or second(s).

In an aspect, the data periods 902a-g can include data. Data included in the data periods 902a-g can be time series data. For instance, the data periods 902a-g can include at least first data (e.g., DATA_1 shown in FIG. 9) that corresponds to first time series data associated with a first time value, second data (e.g., DATA_2 shown in FIG. 9) that corresponds to second time series data associated with a second time value, etc. In a non-limiting example, the data period 902a can include at least first data equal to "0" and second data equal to "1", the data period 902b can include at least first data equal to "1" and second data equal to "2", the data period 902c can include at least first data equal to "1" and second data equal to "3", the data period 902d can include at least first data equal to "2" and second data equal to "3", the data period 902e can include at least first data equal to "0" and second data equal to "0", the data period 902f can include at least first data equal to "2" and second data equal to "0", and the data period 902g can include at least first data equal to "9" and second data equal to "1". However, it is to be appreciated that the data periods 902a-g can include different data values. In another aspect, the data periods 902a-g can be associated with one or more user identifiers (e.g., one or more users) and/or one or more device identifiers (e.g., one or more computing devices). For example, the data periods 902a-c can be associated with an identity A. The identity A can correspond to a user identity (e.g., a user that generates data associated with the data periods 902a-c) or a device identity (e.g., a computing device that generates data associated with data periods 902a-c). Furthermore, the data periods 902d-g can be associated with an identity B that is different than the identity B. The identity B can correspond to another user identity (e.g., another user that generates data associated with the data periods 902d-g) or another device identity (e.g., another computing device that generates data associated with the data periods 902d-g).

Figure 10:
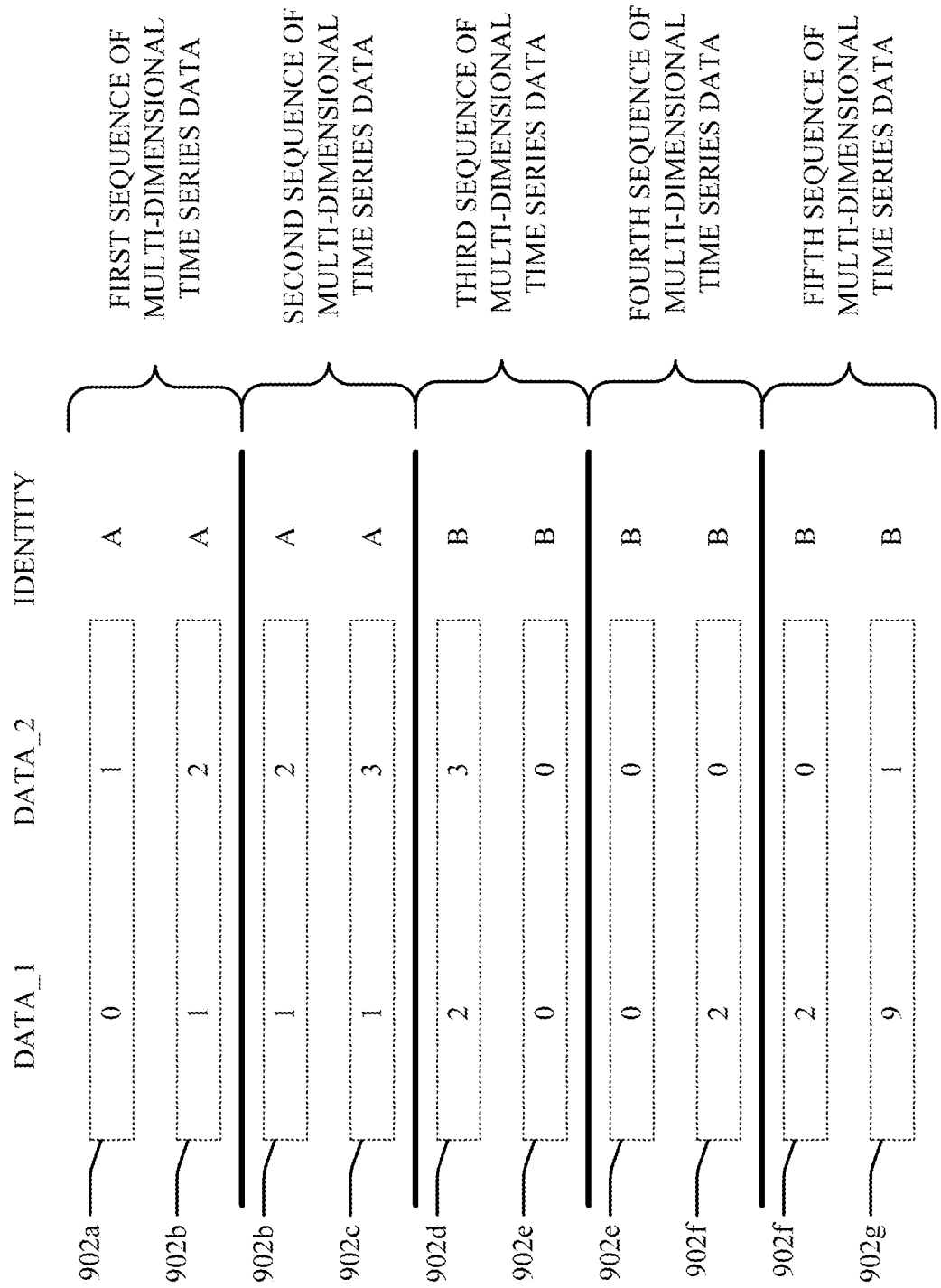
FIG. 10 illustrates example, non-limiting sequence(s) of multi-dimensional time series data in accordance with one or more embodiments described herein.

FIG. 10 illustrates an example, non-limiting system 1000 in accordance with one or more embodiments described herein. Repetitive description of like elements employed in other embodiments described herein is omitted for sake of brevity.

In an embodiment shown in FIG. 10, the data periods 902a-g can be divided into a set of sequences of multi-dimensional time series data. For example, the snapshot component 104 can divide the data periods 902a-g into a first sequence of multi-dimensional time series data, a second sequence of multi-dimensional time series data, a third sequence of multi-dimensional time series data, a fourth sequence of multi-dimensional time series data, and a fifth sequence of multi-dimensional time series data. The first sequence of multi-dimensional time series data can include a first set of data associated with the data period 902a and the data period 902b, the second sequence of multi-dimensional time series data can include a second set of data associated with the data period 902b and the data period 902c, the third sequence of multi-dimensional time series data can include a third set of data associated with the data period 902d and the data period 902e, the fourth sequence of multi-dimensional time series data can include a fourth set of data associated with the data period 902e and the data period 902f, and the fifth sequence of multi-dimensional time series data can include a fifth set of data associated with the data period 902f and the data period 902g. However, it is to be appreciated that the data periods 902a-g can be divided into a different number of sequences of multi-dimensional time series data. As such, a portion of the first sequence of multi-dimensional time series and the second sequence of multi-dimensional time series associated with the identity A can comprise corresponding data (e.g., data associated with the data period 902b). Furthermore, a portion of the third sequence of multi-dimensional time series and the fourth sequence of multi-dimensional time series associated with the identity B can comprise corresponding data (e.g., data associated with the data period 902e), and a portion of the fourth sequence of multi-dimensional time series and the fifth sequence of multi-dimensional time series associated with the identity B can comprise corresponding data (e.g., data associated with the data period 902f). In an embodiment, the first sequence of multi-dimensional time series data, the second sequence of multi-dimensional time series data, the third sequence of multi-dimensional time series data, the fourth sequence of multi-dimensional time series data, and the fifth sequence of multi-dimensional time series data can correspond to different rows or different columns of a data matrix associated with the multi-dimensional time series data 900.

Figure 11:
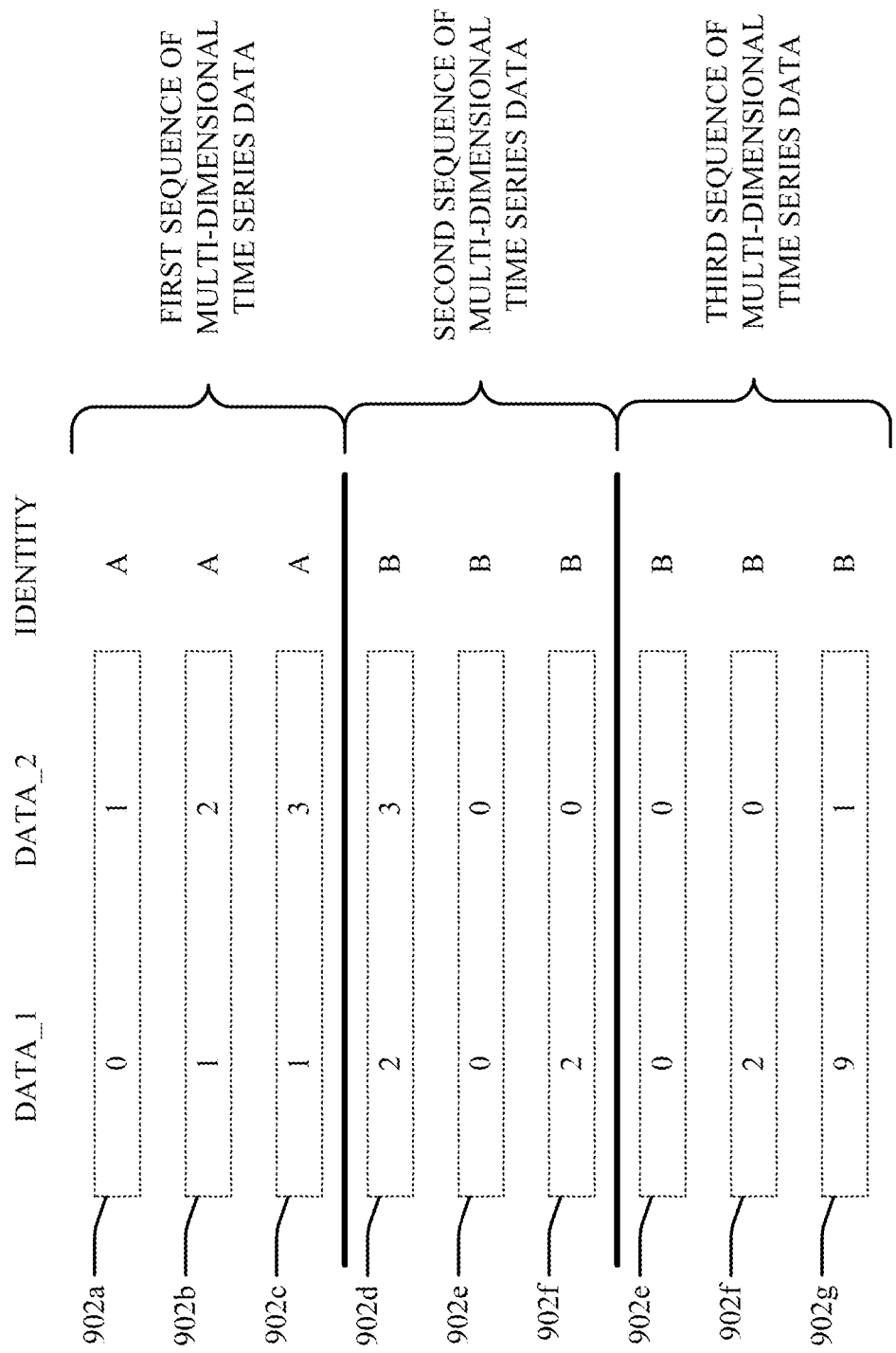
FIG. 11 illustrates other example, non-limiting sequence(s) of multi-dimensional time series data in accordance with one or more embodiments described herein.

FIG. 11 illustrates an example, non-limiting system 1100 in accordance with one or more embodiments described herein. Repetitive description of like elements employed in other embodiments described herein is omitted for sake of brevity.

In an embodiment shown in FIG. 11, the data periods 902a-g can be divided into a set of sequences of multi-dimensional time series data. For example, the snapshot component 104 can divide the data periods 902a-g into a first sequence of multi-dimensional time series data, a second sequence of multi-dimensional time series data, and a third sequence of multi-dimensional time series data. The first sequence of multi-dimensional time series data can include a first set of data associated with the data period 902a, the data period 902b and the data period 902c. The second sequence of multi-dimensional time series data can include a second set of data associated with the data period 902d, the data period 902e and the data period 902f. Furthermore, the third sequence of multi-dimensional time series data can include a third set of data associated with the data period 902e, the data period 902f and the data period 902g. However, it is to be appreciated that the data periods 902a-g can be divided into a different number of sequences of multi-dimensional time series data. As such, a portion of the second sequence of multi-dimensional time series and the third sequence of multi-dimensional time series associated with the identity b can comprise corresponding data (e.g., data associated with the data period 902e and the data period 902f). In an embodiment, the first sequence of multi-dimensional time series data, the second sequence of multi-dimensional time series data, and the third sequence of multi-dimensional time series data can correspond to different rows or different columns of a data matrix associated with the multi-dimensional time series data 900.

Figure 12:
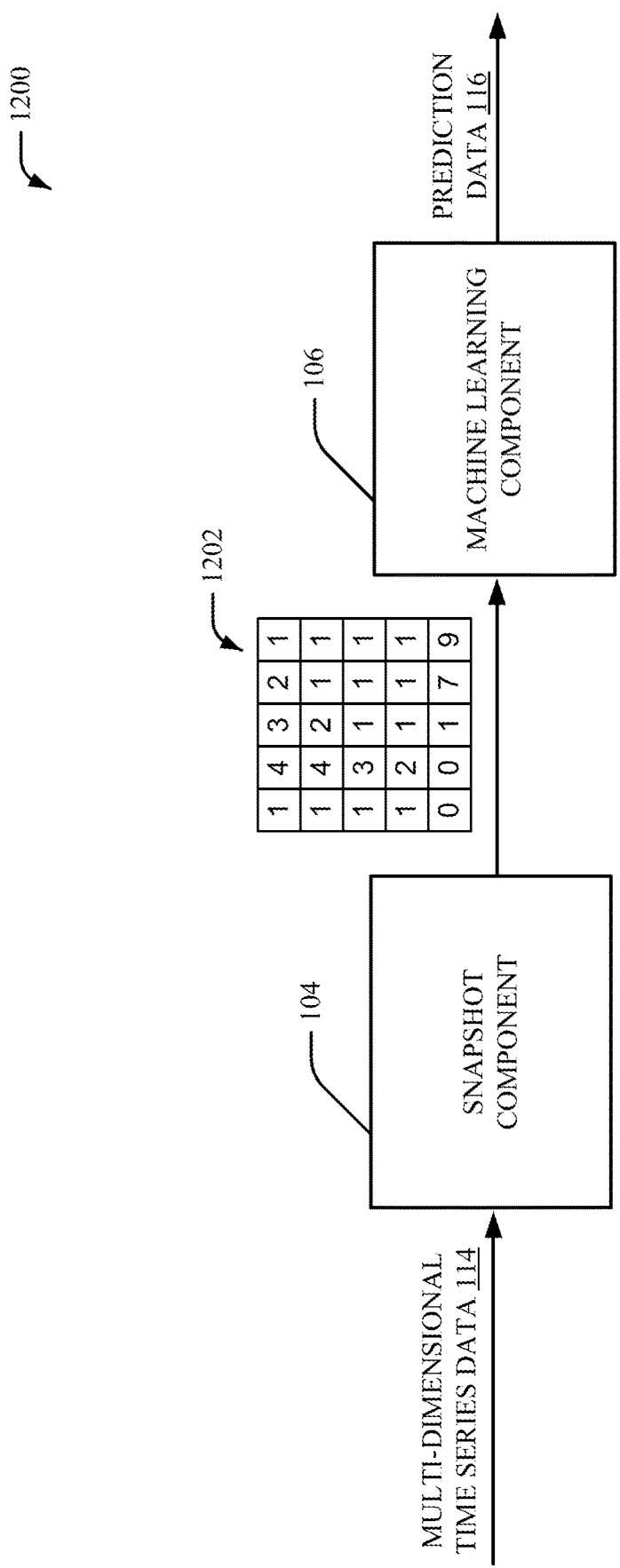
FIG. 12 illustrates a block diagram of an example, non-limiting system to facilitate machine learning using a data matrix associated with multi-dimensional time series data in accordance with one or more embodiments described herein

FIG. 12 illustrates a block diagram of an example, non-limiting system 1200 in accordance with one or more embodiments described herein. Repetitive description of like elements employed in other embodiments described herein is omitted for sake of brevity.

The system 1200 can illustrate a machine learning process associated with multi-dimensional time series event prediction via a data matrix 1202. The system 1200 includes the snapshot component 104 and the machine learning component 106 (e.g., the convolutional neural network component 202 and the classifier component 204). As shown in FIG. 12, the snapshot component 104 can receive the multi-dimensional time series data 114. Furthermore, the snapshot component 104 can generate the data matrix 1202 based on the multi-dimensional time series data 114. For instance, the data matrix 1202 can be associated with the snapshot data 402 (e.g., the snapshot data 402 can include the data matrix 1202). In an aspect, the data matrix 1202 can be an array of data elements associated with the multi-dimensional time series data 114. For example, the data matrix 1202 can be an array of data values from the multi-dimensional time series data 114. The machine learning component 106 (e.g., the convolutional neural network component 202 and the classifier component 204) can process and/or analyze the data matrix 1202. For instance, the data matrix 1202 can be provided as input to the convolutional neural network component 202 of the machine learning component 106. In some embodiments, the data matrix 1202 can be, for example, input data employed for a convolutional neural network process associated with a convolutional neural network system of the convolutional neural network component 202. For example, the data matrix 1202 can be a set of inputs for output data (e.g., a machine learning model, a neural network model, etc.) generated by a convolutional neural network system of the convolutional neural network component 202. Based on the data matrix 1202, the machine learning component 106 (e.g., the convolutional neural network component 202 and the classifier component 204) can generate the prediction data 116.

Figure 13:
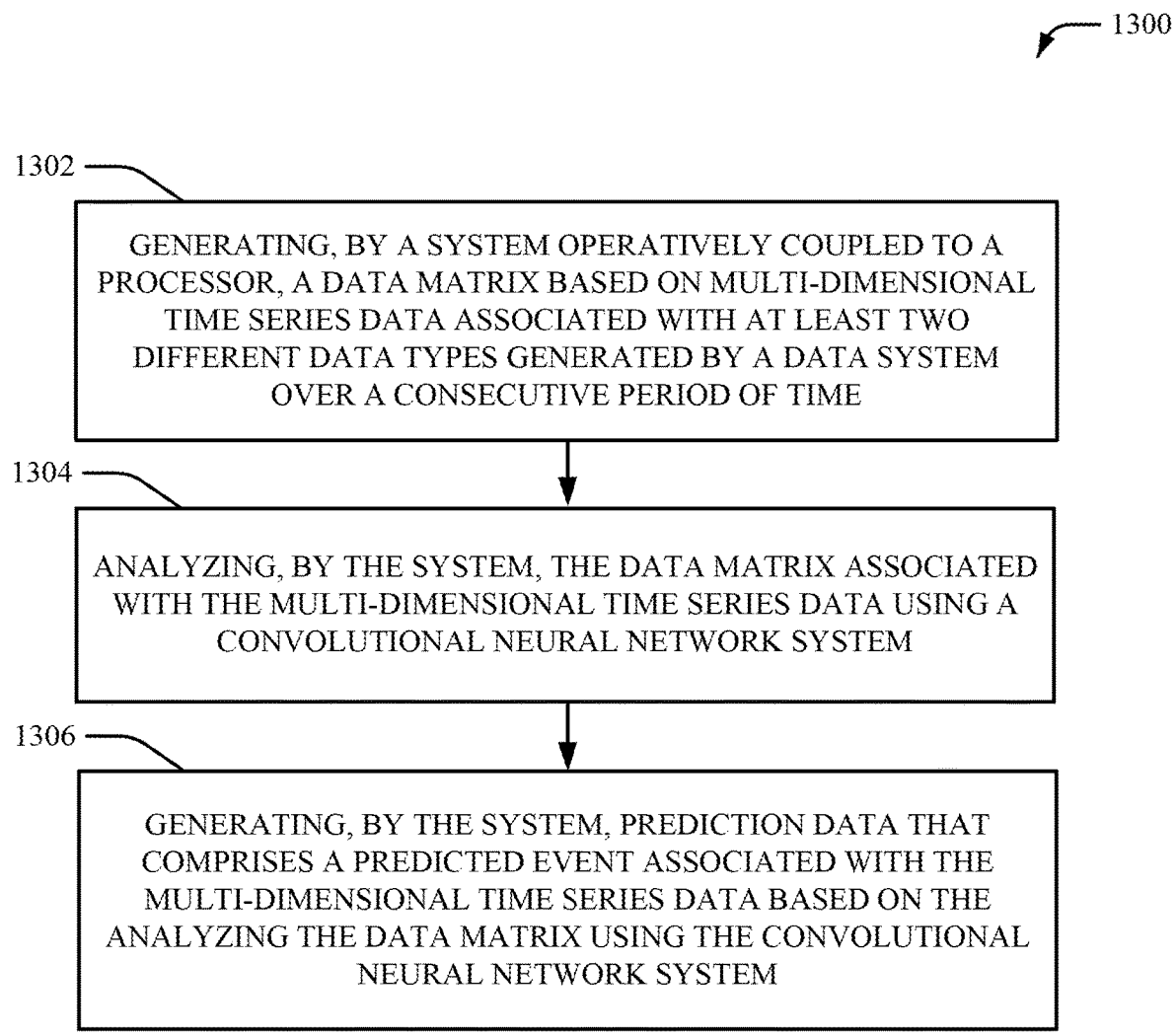
FIG. 13 illustrates a flow diagram of an example, non-limiting computer-implemented method for facilitating machine learning associated with multi-dimensional time series data in accordance with one or more embodiments described herein.

FIG. 13 illustrates a flow diagram of an example, non-limiting computer-implemented method 1300 for facilitating machine learning associated with multi-dimensional time series data in accordance with one or more embodiments described herein. At 1302, a data matrix is generated, by a system operatively coupled to a processor (e.g., by snapshot component 104), based on multi-dimensional time series data associated with at least two different data types generated by a data system over a consecutive period of time. For example, data elements of the data matrix can correspond to data elements included in the multi-dimensional time series data. At 1304, the data matrix associated with the multi-dimensional time series data is analyzed, by the system (e.g., by machine learning component 106), using a convolutional neural network system. For example, the data matrix can be input for one or more convolutional neural networks associated with the convolutional neural network system. At 1306, prediction data that comprises a predicted event associated with the multi-dimensional time series data is generated, by the system (e.g., by machine learning component 106), based on the analyzing the data matrix using the convolutional neural network system. For example, data generated by the one or more convolutional neural networks associated with the convolutional neural network system can be classified to provide the prediction data that comprises the predicted event associated with the multi-dimensional time series data. In certain embodiments, the method 1300 can further include modifying, by the system, the data matrix based on the prediction data. For instance, the method 1300 can further include modifying, by the system, a size of the data matrix and/or one or more other characteristics of the data matrix based on the prediction data. Additionally or alternatively, in certain embodiments, the method 1300 can include modifying, by the system, a characteristic of the convolutional neural network system based on the prediction data. A characteristic of the convolutional neural network system can include, for example, a number of layers for a convolutional neural network associated with the convolutional neural network system, a dropout rate for a convolutional neural network associated with the convolutional neural network system, number of filters for a convolutional neural network associated with the convolutional neural network system, a filter size for a convolutional neural network associated with the convolutional neural network system, and/or one or more other characteristics for a convolutional neural network associated with the convolutional neural network system.

Figure 14:
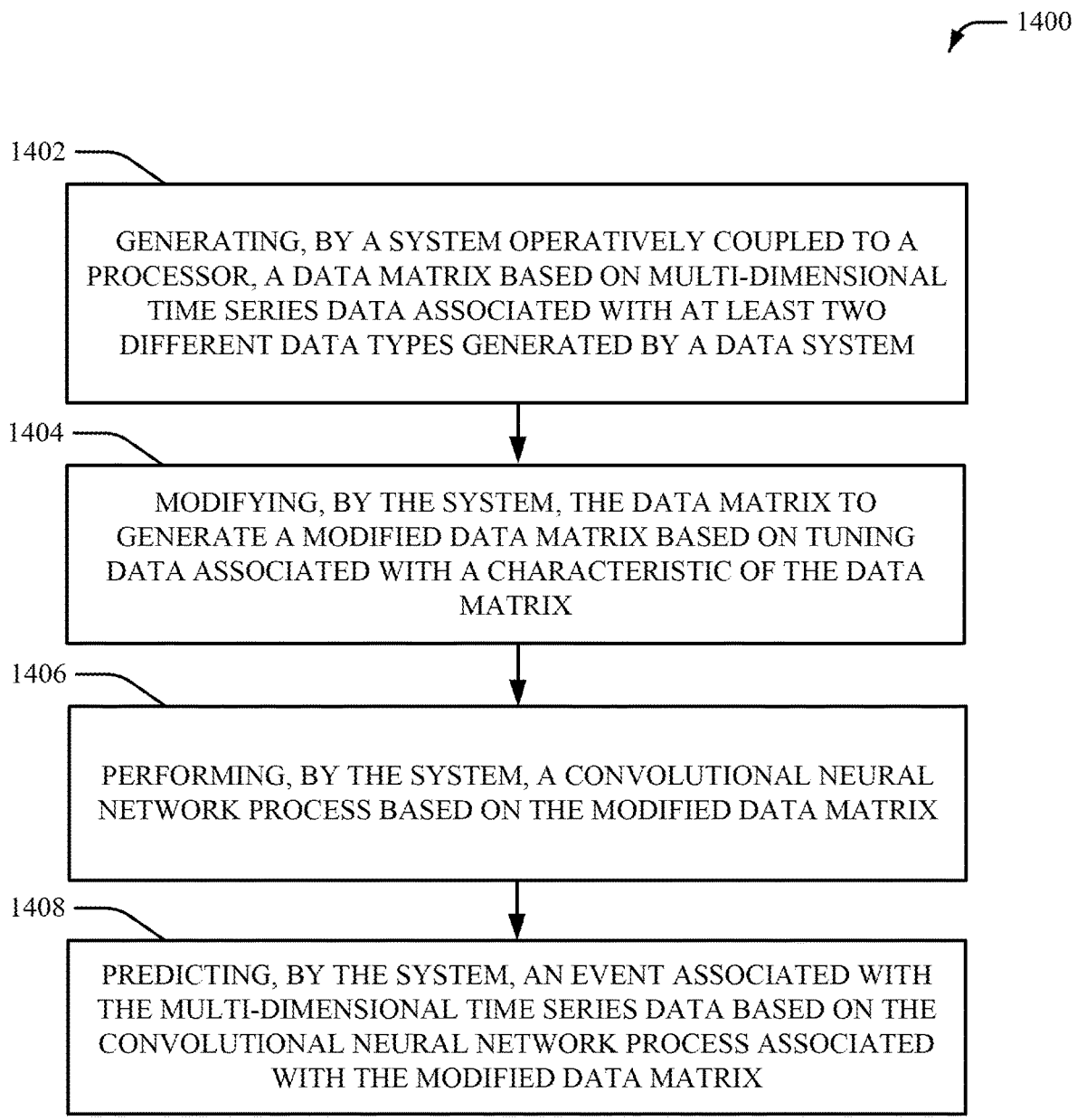
FIG. 14 illustrates a flow diagram of another example, non-limiting computer-implemented method for facilitating machine learning associated with multi-dimensional time series data in accordance with one or more embodiments described herein.

FIG. 14 illustrates a flow diagram of another example, non-limiting computer-implemented method 1400 for facilitating machine learning associated with multi-dimensional time series data in accordance with one or more embodiments described herein. At 1402, a data matrix is generated, by a system operatively coupled to a processor (e.g., using snapshot component 104), based on multi-dimensional time series data associated with at least two different data types generated by a data system. For example, data elements of the data matrix can correspond to data elements included in the multi-dimensional time series data. At 1404, the data matrix is modified, by the system (e.g., using tuning component 302), to generate a modified data matrix based on tuning data associated with a characteristic of the data matrix. For example, a size of the data matrix can be modified based data generated by one or more convolutional neural networks. At 1406, a convolutional neural network process is performed, by the system (e.g., using machine learning component 106), based on the modified data matrix. For example, the modified data matrix can be provided as input for one or more convolutional neural networks associated with the convolutional neural network process. At 1408, an event associated with the multi-dimensional time series data is predicted, by the system (e.g., using machine learning component 106), based on the convolutional neural network process associated with the modified data matrix. For example, data generated by the one or more convolutional neural networks associated with the convolutional neural network process can be classified to provide prediction data that comprises the predicted event associated with the multi-dimensional time series data. In certain embodiments, the method 1400 can further include generating, by the system, the tuning data based on another convolutional neural network process (e.g., a previously performed convolutional neural network process) associated with the data matrix. Additionally or alternatively, in certain embodiments, the method 1400 can further include tuning, by the system, the convolutional neural network process based on another convolutional neural network process associated with the data matrix.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least generating a data matrix, analyzing a data matrix, generating prediction data, modifying a data matrix, performing a convolutional neural network process, and/or predicting an event are established from a combination of electrical and mechanical components and circuitry, a human is unable to replicate or perform processing performed by the prediction component 102 (e.g., the snapshot component 104, the machine learning component 106, the convolutional neural network component 202, the classifier component 204 and/or the tuning component 302) disclosed herein. For example, a human is unable to communicate multi-dimensional time series data, analyze multi-dimensional time series data associated with a data matrix, perform a machine learning process (e.g., a convolutional neural network process, and/or tune a machine learning process (e.g., a convolutional neural network process.

Figure 15:
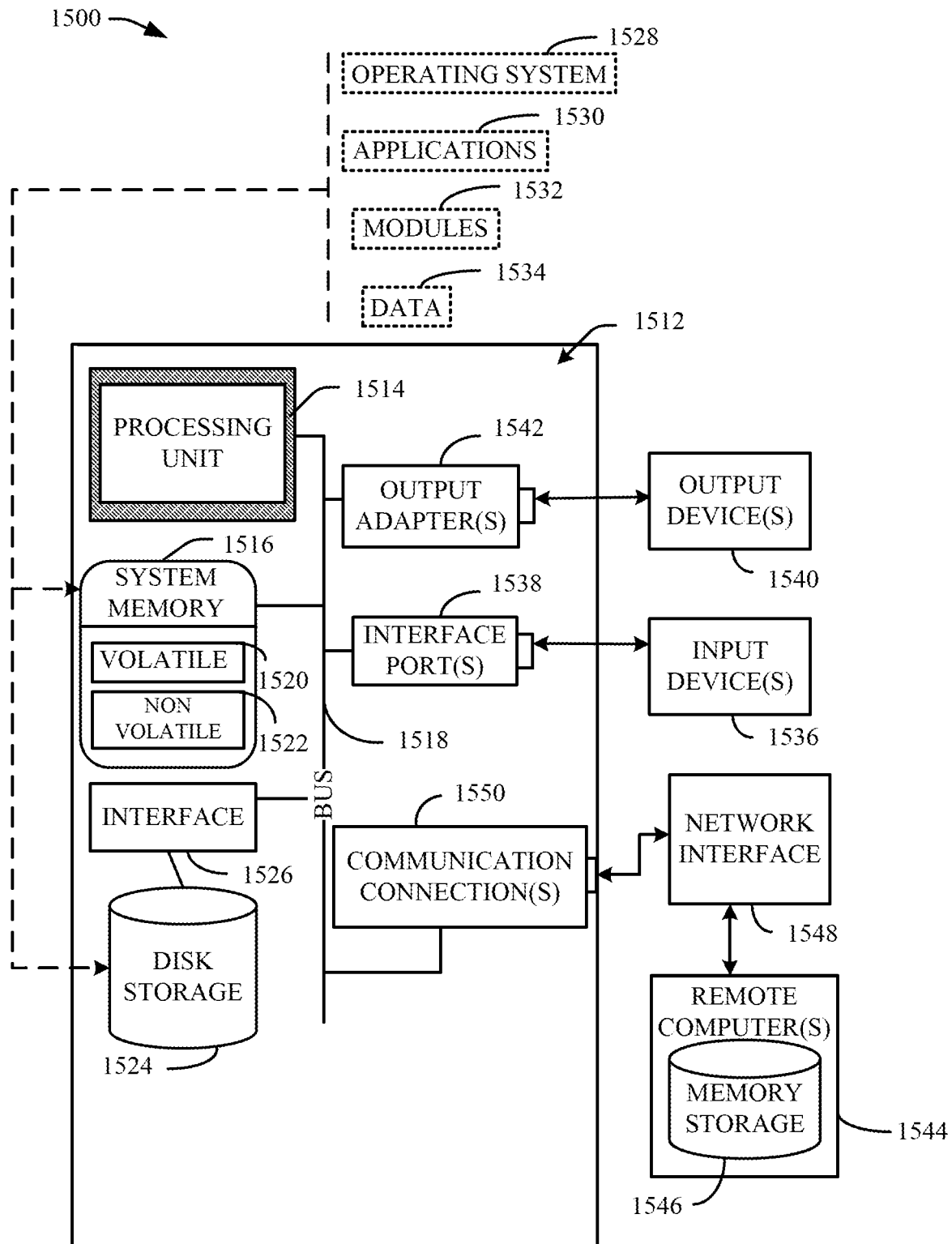
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity.

With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. Computer 1512 can also include removable/non-removable, volatile/non-volatile computer storage media. FIG. 15 illustrates, for example, a disk storage 1524.

Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media. To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512.

System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
   a snapshot component that generates a first sequence of multi-dimensional time series data and a second sequence of multi-dimensional time series data from multi-dimensional time series data associated with at least two different data types generated by a data system over a consecutive period of time, wherein the first sequence and the second sequence comprise: dynamic data having a time dependency with one or more other data elements included in the multi-dimensional time series data and that has been modified by the snapshot component one or more times, and static data that has not been modified by the snapshot component; and
   a machine learning component that:
   concurrently analyzes the first sequence of multi-dimensional time series data and the second sequence of multi-dimensional time series data using a convolutional neural network system that outputs features to a classifier to generate a prediction result associated with a prediction of an event associated with the multi-dimensional time series data; and
   determines and provides as feedback based on the prediction result, information to tune one or more parameters for the convolutional neural network system based on characteristics of the multi-dimensional time series data, wherein the one or more parameters comprise at least one of a number of hidden layers for the convolutional neural network, a dropout rate for the convolutional neural network or a type of filter for the convolutional neural network.

2. The system of claim 1, wherein the snapshot component generates a data matrix associated with the first sequence of multi-dimensional time series data and the second sequence of multi-dimensional time series data, wherein the machine learning component analyzes the data matrix using the convolutional neural network system, and wherein the prediction result is also associated with feedback to be provided to the system to modify a size of the multi-dimensional time series data.

3. The system of claim 1, wherein the machine learning component analyzes the first sequence of multi-dimensional time series data and the second sequence of multi-dimensional time series data using a parallel network of processing units associated with the convolutional neural network system, and wherein performance of the processor to predict the event associated with the multi-dimensional time series data is improved by employing the convolutional neural network system.

4. The system of claim 1, wherein the snapshot component determines a size of the first sequence of multi-dimensional time series data and the second sequence of multi-dimensional time series data based on data associated with the convolutional neural network system.

5. The system of claim 1, wherein the snapshot component determines a set of parameters for the convolutional neural network system based on a classification of data associated with the convolutional neural network system.

6. The system of claim 1, wherein a portion of data from the first sequence of multi-dimensional time series data corresponds to the second sequence of multi-dimensional time series data, and wherein the machine learning component analyzes the portion of the data.

7. The system of claim 1, wherein at least the first sequence of multi-dimensional time series data comprises dynamic data that is related to other data included in the first sequence of multi-dimensional time series data or the second sequence of multi-dimensional time series data, and wherein the machine learning component analyzes the dynamic data.

8. The system of claim 1, wherein the snapshot component generates the first sequence of multi-dimensional time series data and the second sequence of multi-dimensional time series data based on feedback data indicative of information for tuning the first sequence of multi-dimensional time series data and the second sequence of multi-dimensional time series data.

9. The system of claim 8, wherein the feedback data comprises a tuning value for the one or more parameters, wherein the tuning value comprises a first tuning value for the number of hidden layers for the convolutional neural network, a second tuning value for the dropout rate for the convolutional neural network or the tuning value for the type of filter for the convolutional neural network.

10. The system of claim 1, wherein the machine learning component adjusts the convolutional neural network system based on feedback data indicative of information for tuning the convolutional neural network system.

11. The system of claim 1, wherein the convolutional neural network system is associated with nonlinear processing of features associated with the first sequence of multi-dimensional time series data and the second sequence of multi-dimensional time series data.

12. The system of claim 1, further comprising:
a display component that generates a user interface to display output data associated with the event in a human interpretable format.

13. The system of claim 1, further comprising a prediction component that predicts timing of a first option trade based on the multi-dimensional time series data received by the prediction component.

14. The system of claim 1, further comprising a prediction component that provides a prediction associated with approval of an account based on the multi-dimensional time series data received by the prediction component.

15. A computer program product for machine learning, the computer program product comprising a computer readable storage medium having program instructions embodied therewith, the program instructions executable by processor to cause the processor to:
generate, by the processor, a data matrix based on first time series data associated with a first data source and second time series data associated with a second data source;
analyze, by the processor, the data matrix associated with the first time series data and the second time series data using a convolutional neural network system, wherein the first sequence and the second sequence comprise dynamic data having a time dependency with one or more other data elements included in the first sequence or the second sequence and having been modified one or more times, and static data that has not been modified;
generate, by the processor, prediction data that comprises a predicted event associated with the first time series data and the second time series data based on data generated by the convolutional neural network system and an output of a classifier; and
determine one or more parameters for the convolutional neural network system based on characteristics of the multi-dimensional time series data, wherein the one or more parameters comprise a dropout rate for the convolutional neural network.

16. The computer program product of claim 15, wherein the program instructions are further executable by the processor to cause the processor to:
modify, by the processor, the data matrix based on the data generated by the convolutional neural network system.

17. The computer program product of claim 15, wherein the program instructions are further executable by the processor to cause the processor to:
modify, by the processor, a convolutional neural network associated with the convolutional neural network system based on the data generated by the convolutional neural network system.

18. A computer program product for machine learning, the computer program product comprising a computer readable storage medium having program instructions embodied therewith, the program instructions executable by processor to cause the processor to:
generate, by the processor, a data matrix based on multi-dimensional time series data associated with at least two different data types and is comprised of dynamic data and static data;
perform, by the processor, a convolutional neural network process based on the data matrix associated with the multi-dimensional time series data;
generate, by the processor, prediction data that comprises a predicted event associated with the multi-dimensional time series data based on the convolutional neural network process that outputs features to a classifier; and
determine, by the processor, one or more parameters for the convolutional neural network system based on characteristics of the multi-dimensional time series data, wherein the one or more parameters comprise at least one of a number of hidden layers for the convolutional neural network, a dropout rate for the convolutional neural network or a type of filter for the convolutional neural network and information to tune a number of observations to include in the multi-dimensional time series data.

19. The computer program product of claim 18, wherein the program instructions are further executable by the processor to cause the processor to:
   modify, by the processor, the data matrix based on the prediction data.

20. The computer program product of claim 18, wherein the program instructions are further executable by the processor to cause the processor to:
   modify, by the processor, a convolutional neural network associated with the convolutional neural network process based on the prediction data.

* * * * *